(12) United States Patent
Weng et al.

(10) Patent No.: US 10,794,154 B2
(45) Date of Patent: Oct. 6, 2020

(54) METHOD OF PERFORMING COMPLEX FRACTURE OPERATIONS AT A WELLSITE HAVING LEDGED FRACTURES

(71) Applicant: Schlumberger Technology Corporation, Sugar Land, TX (US)

(72) Inventors: Xiaowei Weng, Fulshear, TX (US); Charles-Edouard Cohen, Rio de Janeiro (BR); George Alan Waters, Oklahoma City, OK (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 15/750,945

(22) PCT Filed: Aug. 5, 2016

(86) PCT No.: PCT/US2016/045688
§ 371 (c)(1),
(2) Date: Feb. 7, 2018

(87) PCT Pub. No.: WO2017/027342
PCT Pub. Date: Feb. 16, 2017

(65) Prior Publication Data
US 2018/0230783 A1    Aug. 16, 2018

Related U.S. Application Data

(60) Provisional application No. 62/202,410, filed on Aug. 7, 2015.

(51) Int. Cl.
*E21B 43/26* (2006.01)
*E21B 47/024* (2006.01)
(Continued)

(52) U.S. Cl.
CPC .......... *E21B 41/0092* (2013.01); *E21B 43/11* (2013.01); *E21B 43/267* (2013.01);
(Continued)

(58) Field of Classification Search
CPC .... E21B 33/138; E21B 43/103; E21B 43/267; E21B 47/02208; E21B 47/024
See application file for complete search history.

(56) References Cited

U.S. PATENT DOCUMENTS

| | | | |
|---|---|---|---|
| 6,101,447 | A | 8/2000 | Poe, Jr. |
| 7,363,162 | B2 | 4/2008 | Thambynayagam et al. |

(Continued)

FOREIGN PATENT DOCUMENTS

| | | |
|---|---|---|
| WO | 2013016733 A1 | 1/2013 |
| WO | 2013055930 A1 | 4/2013 |

(Continued)

OTHER PUBLICATIONS

Suarez-Rivera et al., "Defining Three Regions of Hydraulic Fracture Connectivity, in Unconventional Reservoir, Help Designing Completions with Improved Long-Term Productivity", Paper SPE 166505, presented at SPE ATCE, New Orleans, LA, Sep. 30-Oct. 2, 2013, 14 pages.

(Continued)

*Primary Examiner* — Zakiya W Bates
(74) *Attorney, Agent, or Firm* — Rodney Warfford

(57) ABSTRACT

A method of performing a fracture operation at a wellsite is disclosed for a wellsite positioned about a subterranean formation having a wellbore therethrough and a fracture network therein. The fracture network includes natural fractures. The method involves generating wellsite parameters of the wellsite comprising seismic measurements, generating smooth fracture parameters of a smooth fracture by solving governing equations based on the wellsite param- (Continued)

eters, and generating ledged fracture parameters of a ledged fracture by identifying ledge locations and generating ledged fracture parameters of a ledged fracture at the ledge locations by solving the governing equations based on the wellsite parameters for the ledge locations.

19 Claims, 17 Drawing Sheets

(51) Int. Cl.
| | |
|---|---|
| E21B 47/12 | (2012.01) |
| E21B 29/00 | (2006.01) |
| E21B 41/00 | (2006.01) |
| G01V 1/28 | (2006.01) |
| G01V 11/00 | (2006.01) |
| G01V 1/30 | (2006.01) |
| E21B 43/11 | (2006.01) |
| E21B 43/267 | (2006.01) |
| E21B 47/10 | (2012.01) |
| E21B 49/00 | (2006.01) |

(52) U.S. Cl.
CPC ............. *E21B 47/10* (2013.01); *E21B 49/00* (2013.01); *G01V 1/288* (2013.01); *G01V 1/301* (2013.01); *G01V 11/00* (2013.01)

(56) References Cited

U.S. PATENT DOCUMENTS

| | | |
|---|---|---|
| 7,509,245 B2 | 3/2009 | Siebrits et al. |
| 7,716,029 B2 | 5/2010 | Couet et al. |
| 7,784,544 B2 | 8/2010 | Lindvig et al. |
| 7,788,074 B2 | 8/2010 | Scheidt et al. |
| 8,271,243 B2 | 9/2012 | Koutsabeloulis et al. |
| 8,280,709 B2 | 10/2012 | Koutsabeloulis et al. |
| 8,412,500 B2 | 4/2013 | Weng et al. |
| 8,428,923 B2 | 4/2013 | Siebrits et al. |
| 8,571,843 B2 | 10/2013 | Weng et al. |
| 9,228,425 B2 | 1/2016 | Ganguly et al. |
| 9,715,026 B2 | 7/2017 | Ejofodomi et al. |
| 2004/0008580 A1 | 1/2004 | Fisher et al. |
| 2004/0220846 A1 | 11/2004 | Cullick et al. |
| 2008/0091396 A1 | 4/2008 | Kennon et al. |
| 2008/0133186 A1 | 6/2008 | Li et al. |
| 2008/0183451 A1 | 7/2008 | Weng et al. |
| 2009/0095469 A1 | 4/2009 | Dozier |
| 2010/0076738 A1 | 3/2010 | Dean et al. |
| 2010/0088076 A1 | 4/2010 | Koutsabeloulis et al. |
| 2010/0138196 A1 | 6/2010 | Hui et al. |
| 2010/0250215 A1 | 9/2010 | Kennon et al. |
| 2011/0029291 A1 | 2/2011 | Weng et al. |
| 2011/0120706 A1 | 5/2011 | Craig |
| 2011/0125471 A1 | 5/2011 | Craig et al. |
| 2011/0257944 A1 | 10/2011 | Du et al. |
| 2012/0232859 A1 | 9/2012 | Pomerantz et al. |
| 2012/0232872 A1 | 9/2012 | Nasreldin et al. |
| 2013/0006597 A1 | 1/2013 | Craig |
| 2013/0144532 A1 | 6/2013 | Williams et al. |
| 2013/0215712 A1 | 8/2013 | Geiser et al. |
| 2013/0231781 A1 | 9/2013 | Chapman |
| 2013/0238304 A1 | 9/2013 | Glinsky |
| 2013/0304444 A1 | 11/2013 | Strobel et al. |
| 2014/0052377 A1 | 2/2014 | Downie |
| 2014/0076543 A1 | 3/2014 | Ejofodomi et al. |
| 2014/0116776 A1 | 5/2014 | Marx et al. |
| 2014/0149098 A1 | 5/2014 | Bowen et al. |
| 2014/0151033 A1 | 6/2014 | Xu |
| 2014/0151035 A1 | 6/2014 | Cohen et al. |
| 2014/0188892 A1 | 7/2014 | Ludvigsen et al. |
| 2014/0299315 A1 | 10/2014 | Chuprakov et al. |
| 2014/0305638 A1 | 10/2014 | Kresse et al. |
| 2014/0372089 A1 | 12/2014 | Weng et al. |
| 2014/0379317 A1 | 12/2014 | Sanden et al. |
| 2015/0120255 A1 | 4/2015 | King et al. |
| 2015/0151035 A1 | 6/2015 | Huemer |
| 2015/0186570 A1 | 7/2015 | Huang et al. |
| 2015/0204174 A1 | 7/2015 | Kresse et al. |
| 2015/0212224 A1 | 7/2015 | Williams |
| 2016/0266278 A1 | 9/2016 | Holderby et al. |
| 2016/0357883 A1 | 12/2016 | Weng et al. |
| 2016/0357887 A1 | 12/2016 | Ortiz et al. |

FOREIGN PATENT DOCUMENTS

| | | |
|---|---|---|
| WO | 2013067363 A1 | 5/2013 |
| WO | 2014105659 A1 | 7/2014 |
| WO | 2015003028 A1 | 1/2015 |
| WO | 2015069817 A1 | 5/2015 |
| WO | 2017007745 A1 | 1/2017 |
| WO | 2017027068 A1 | 2/2017 |
| WO | 2017027340 A1 | 2/2017 |
| WO | 2017027433 A1 | 2/2017 |

OTHER PUBLICATIONS

Warpinski et al., "Influence of Geologic Discontinuities on Hydraulic Fracture Propagation (includes associated papers 17011 and 17074)", SPE Journal of Petroleum Technology, Feb. 1987, 39(2): 209-220.

Chuprakov et al., "Hydraulic Fracture Height Containment by Weak Horizontal Interfaces", Paper SPE 173337 presented at HFTC, Woodlands, TX, Feb. 3-5, 2015, 17 pages.

Cipolla et al., "The Relationship Between Fracture Complexity, Reservoir Properties, and Fracture-Treatment Design", Paper SPE 115769 presented at SPE ATCE, Denver, CO, Sep. 21-24, 2008, 25 pages.

International Search Report and Written Opinion issued in International Patent Appl. No. PCT/US2016/045688 dated Nov. 22, 2016; 13 pages.

Kresse et al., "Numerical Modeling of Hydraulic Fracturing in Naturally Fractured Formations", 45th US Rock Mechanics/Geomechanics Symposium, San Francisco, CA, Jun. 26-29, 2011, 11 pages.

Weng et al., "Modeling of Hydraulic Fracture Propagation in a Naturally Fractured Formation", Paper SPE 140253 presented at the SPE Hydraulic Fracturing Conference and Exhibition, The Woodlands, Texas, USA, Jan. 24-26, 2011, 18 pages.

Gu et al., "Hydraulic Fracture Crossing Natural Fracture at Non-Orthogonal Angles, a criterion, Its Validation and Applications", SPE 139984 presented at the SPE Hydraulic Fracturing Conference and Exhibition, The Woodlands, Texas, Jan. 24-26, 2011, 11 pages.

International Search Report and Written Opinion issued in International Patent Appl. No. PCT/US2016/045940 dated Nov. 11, 2016; 9 pages.

International Search Report and Written Opinion issued in International Patent Appl. No. PCT/US2016/021159 dated Jun. 23, 2016; 10 pages.

International Search Report and Written Opinion issued in International Patent Application No. PCT/US2016/045682 dated Nov. 22, 2016; 11 pages.

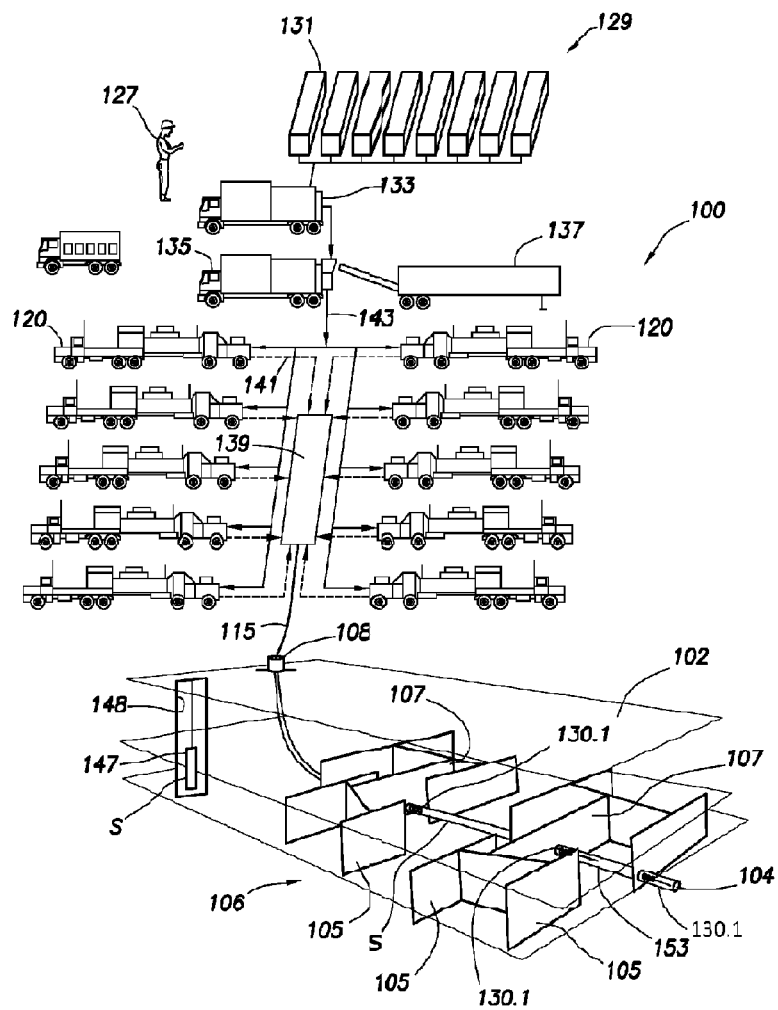
FIG.1.1

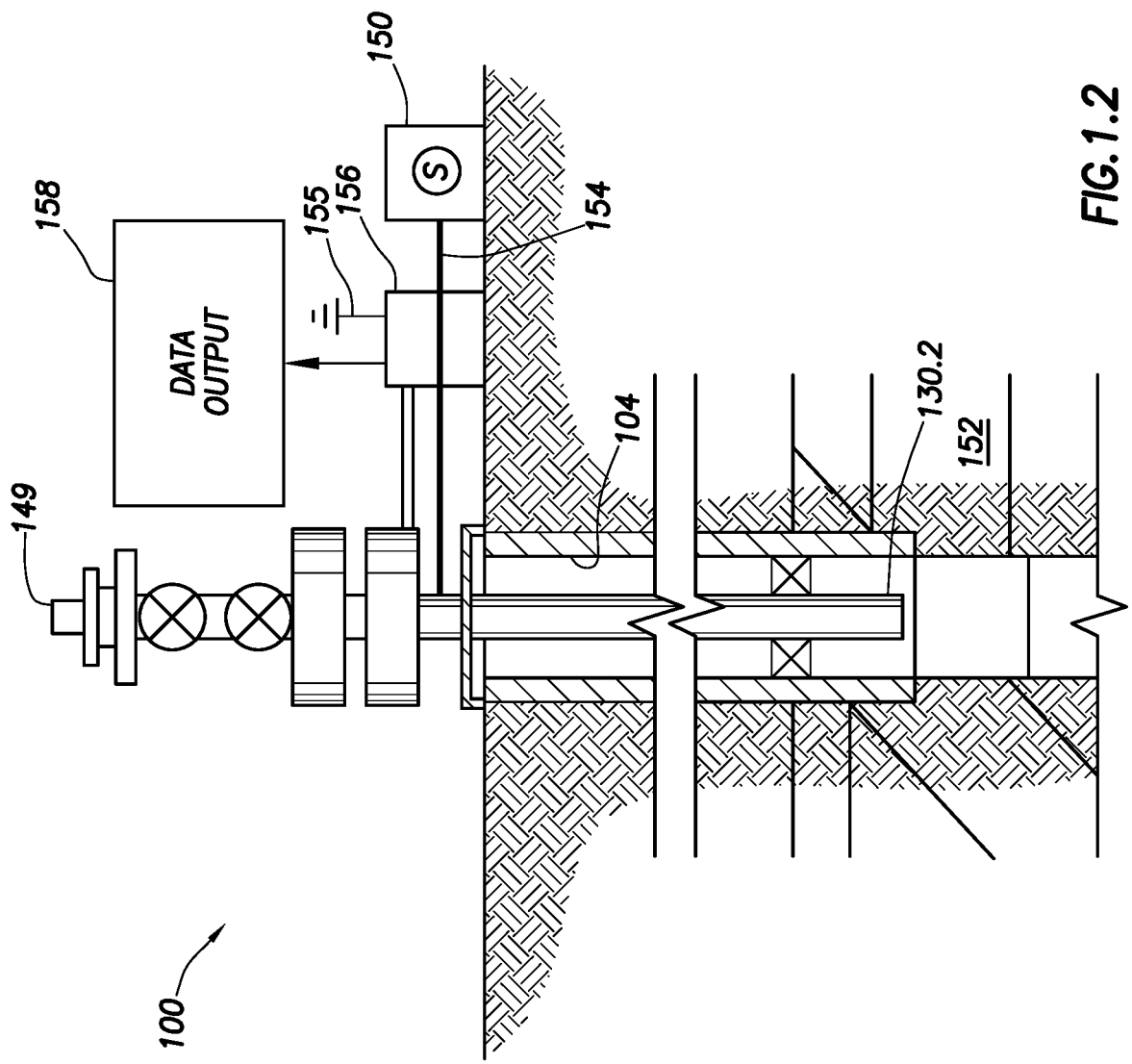
FIG.1.2

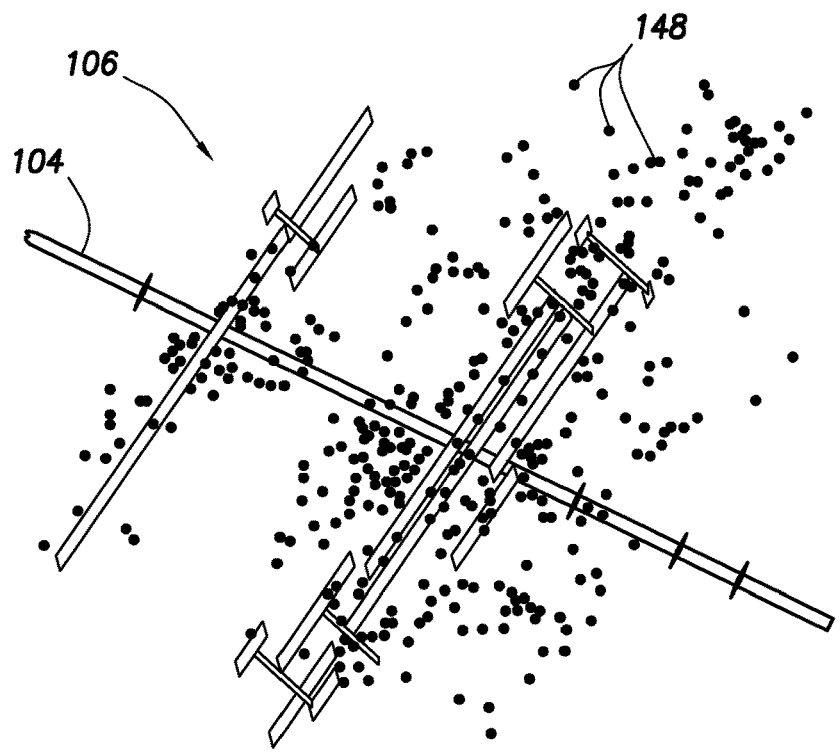
FIG.2
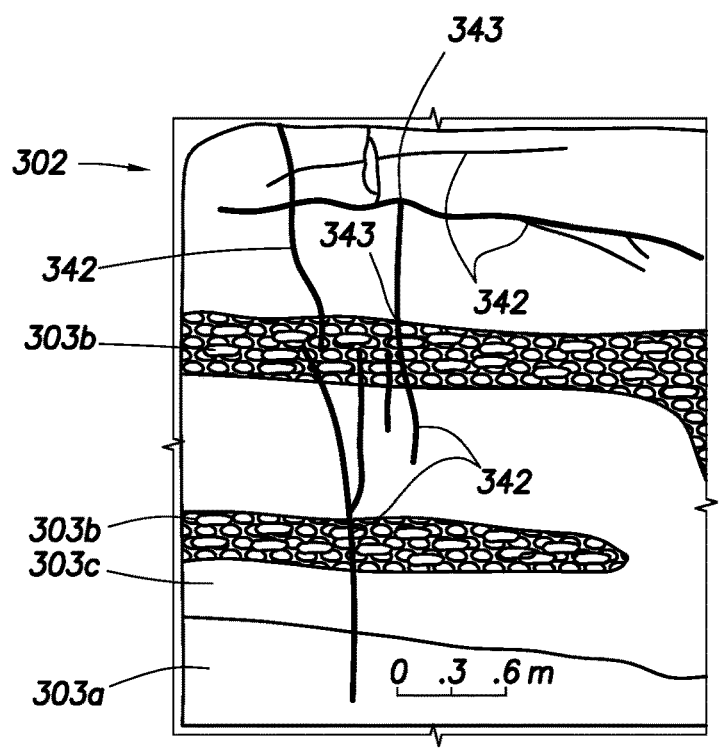
FIG.3.1

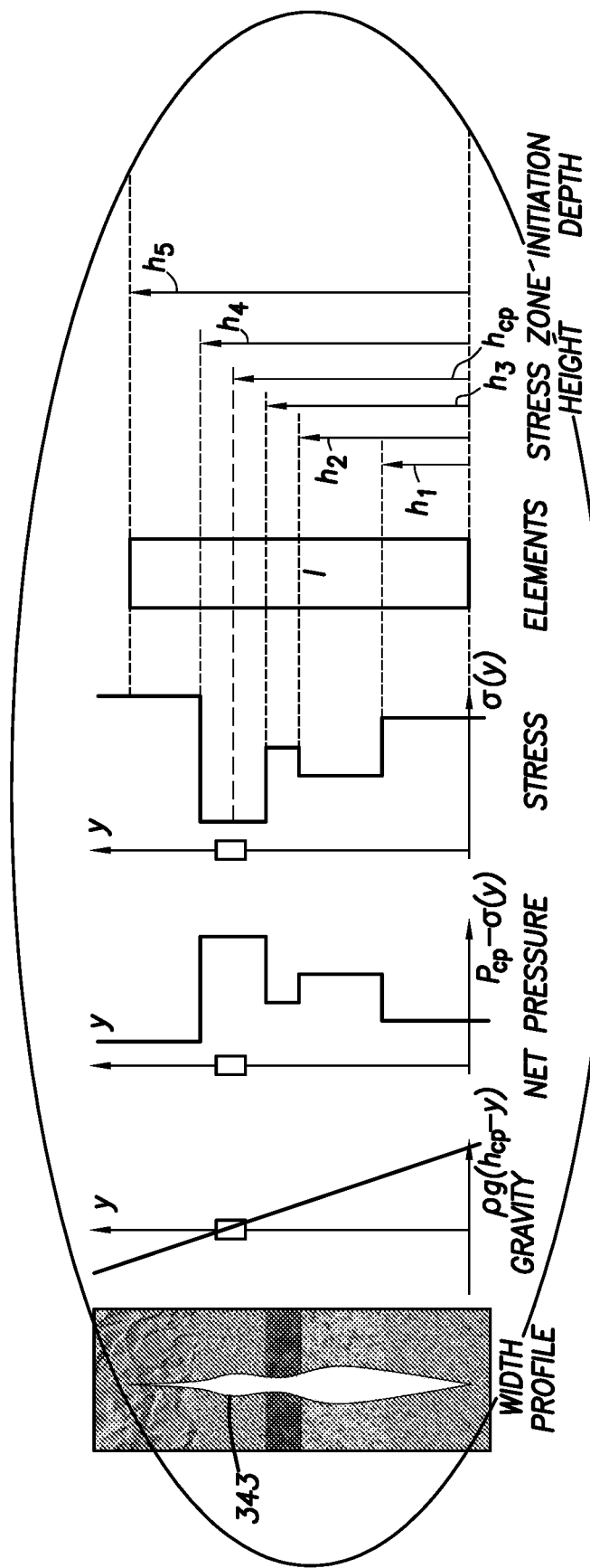
FIG. 3.2

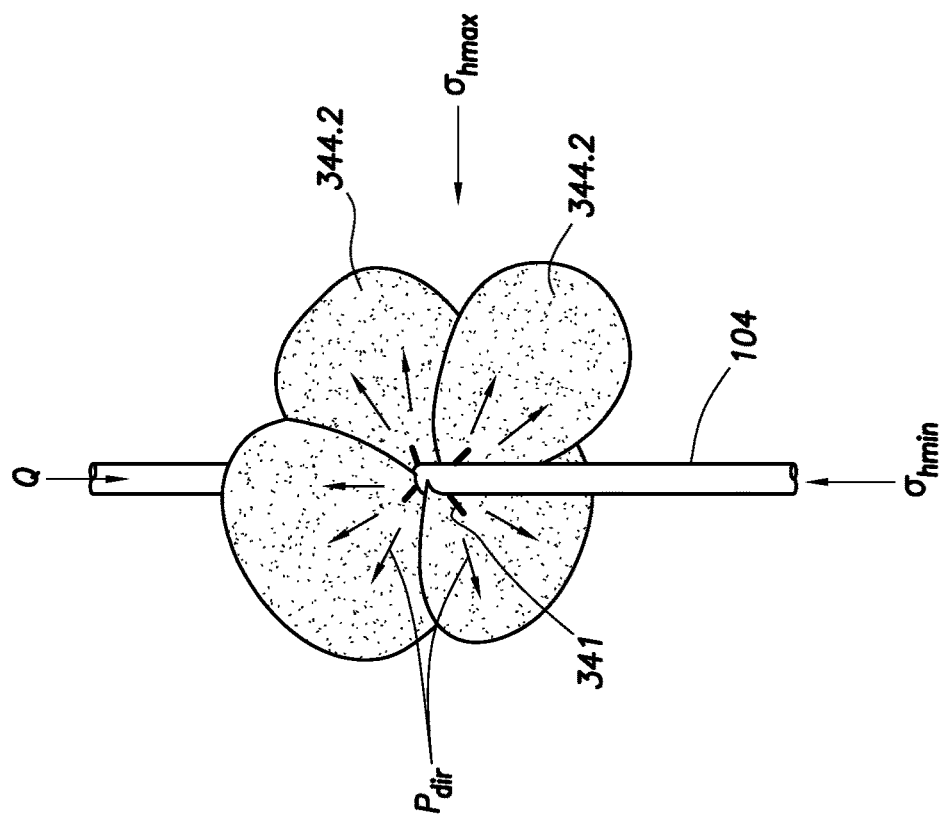
FIG.3.4
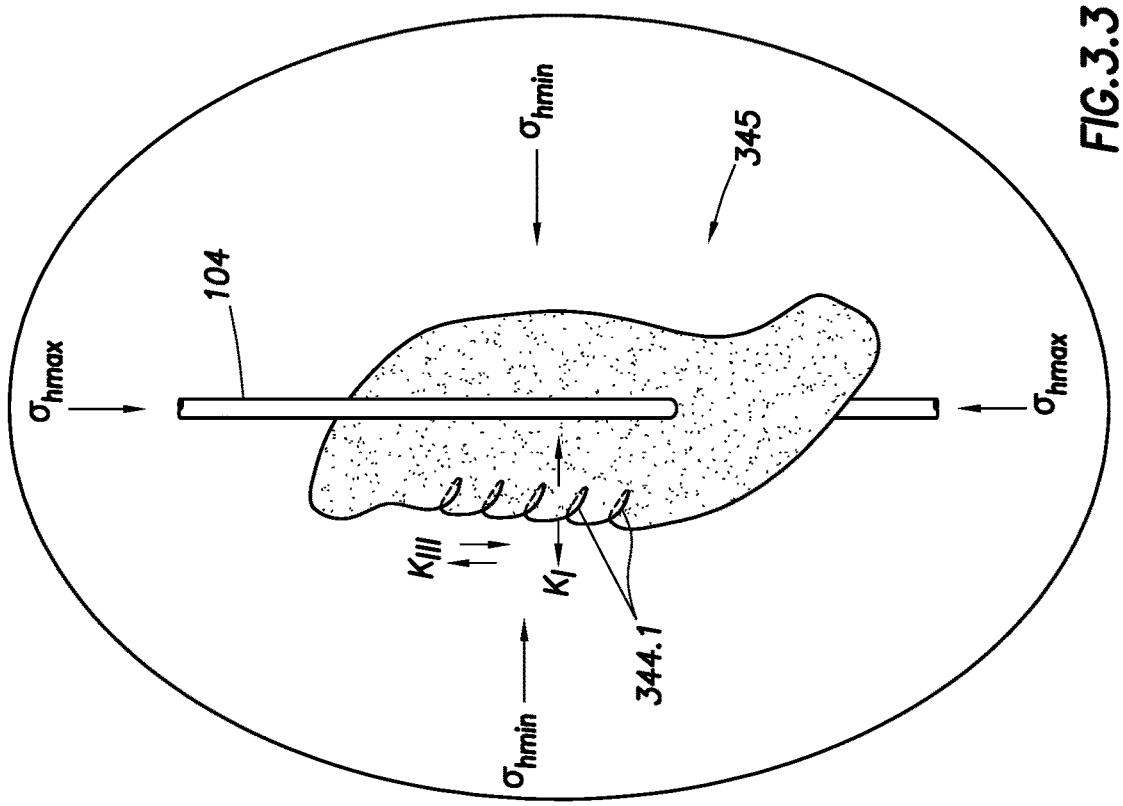
FIG.3.3

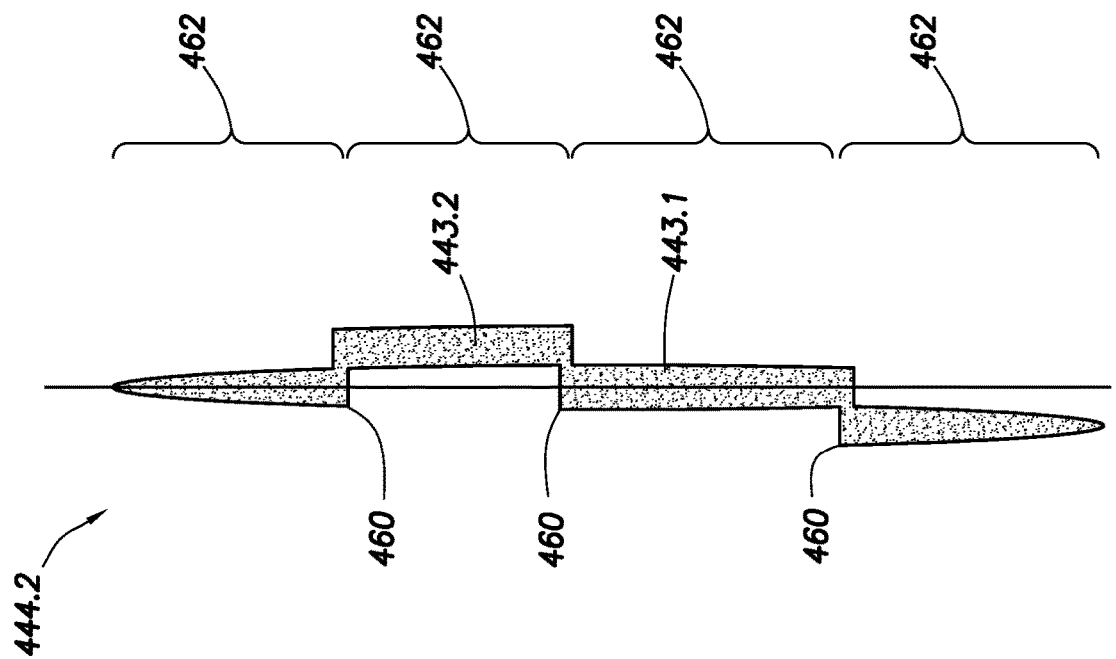
FIG. 4.2
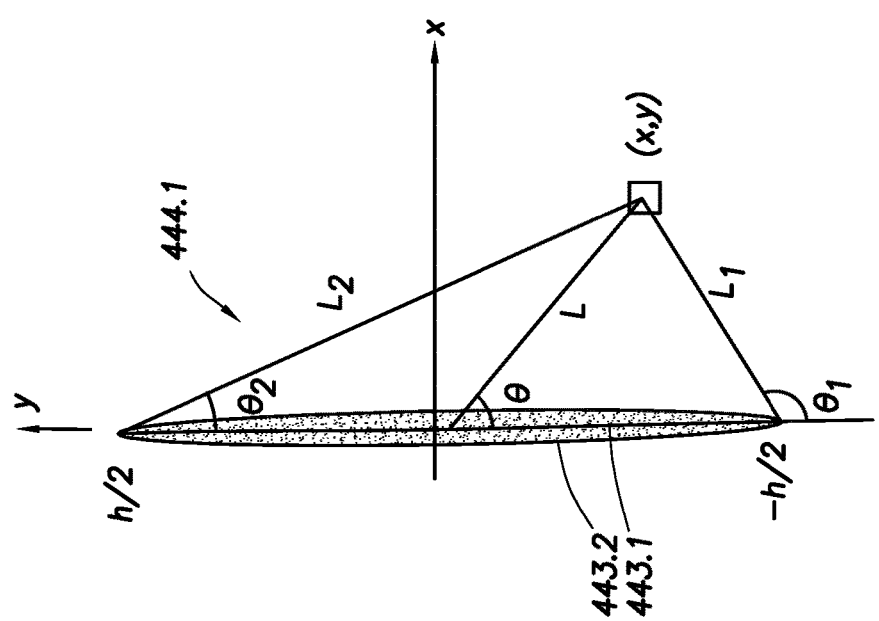
FIG. 4.1

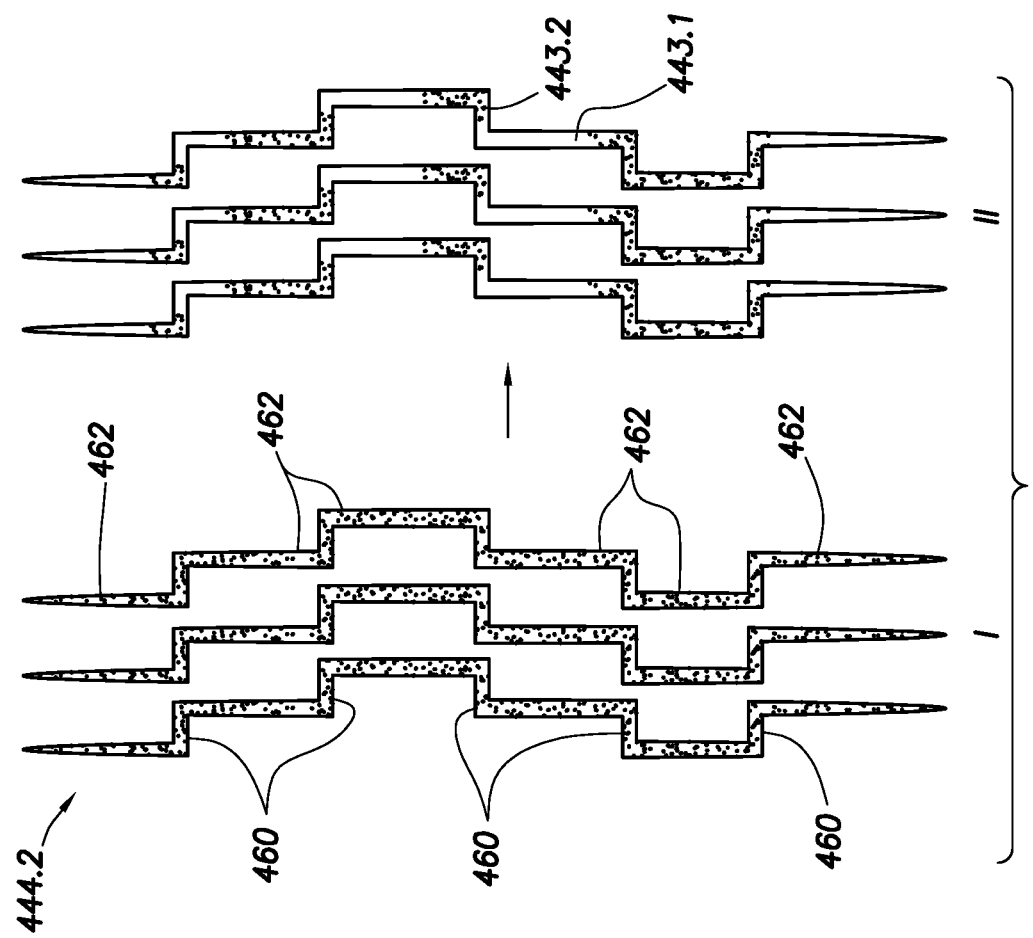
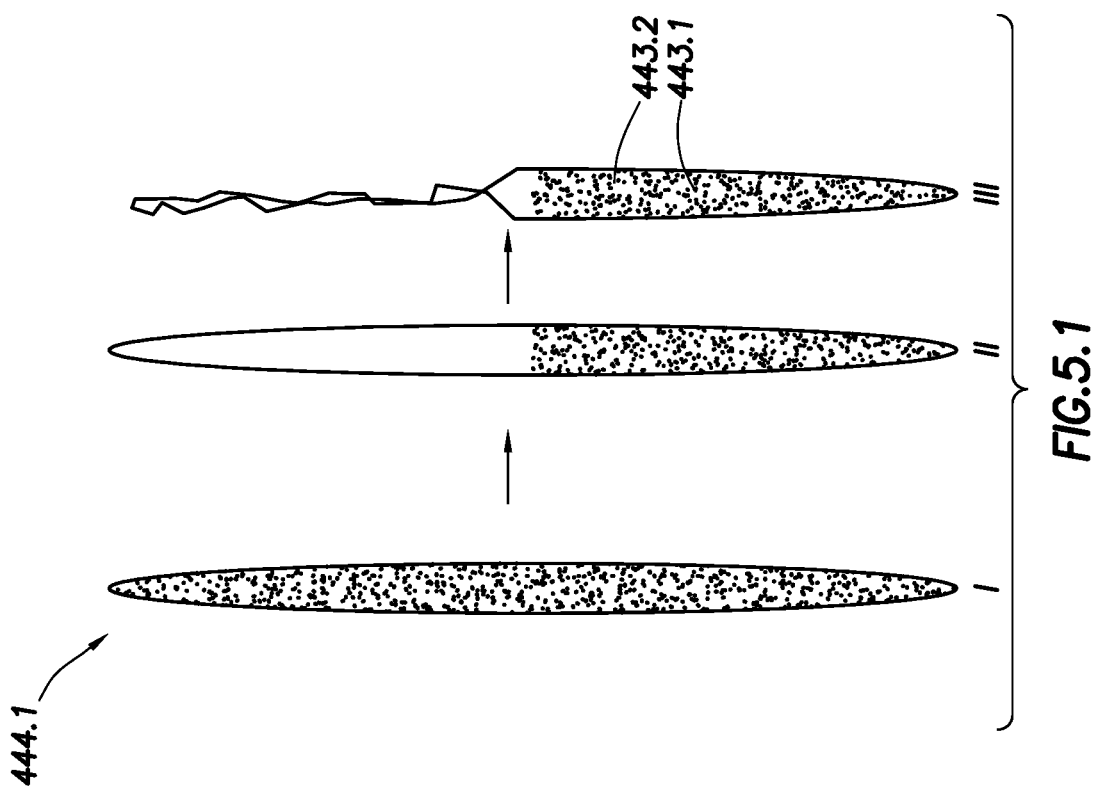

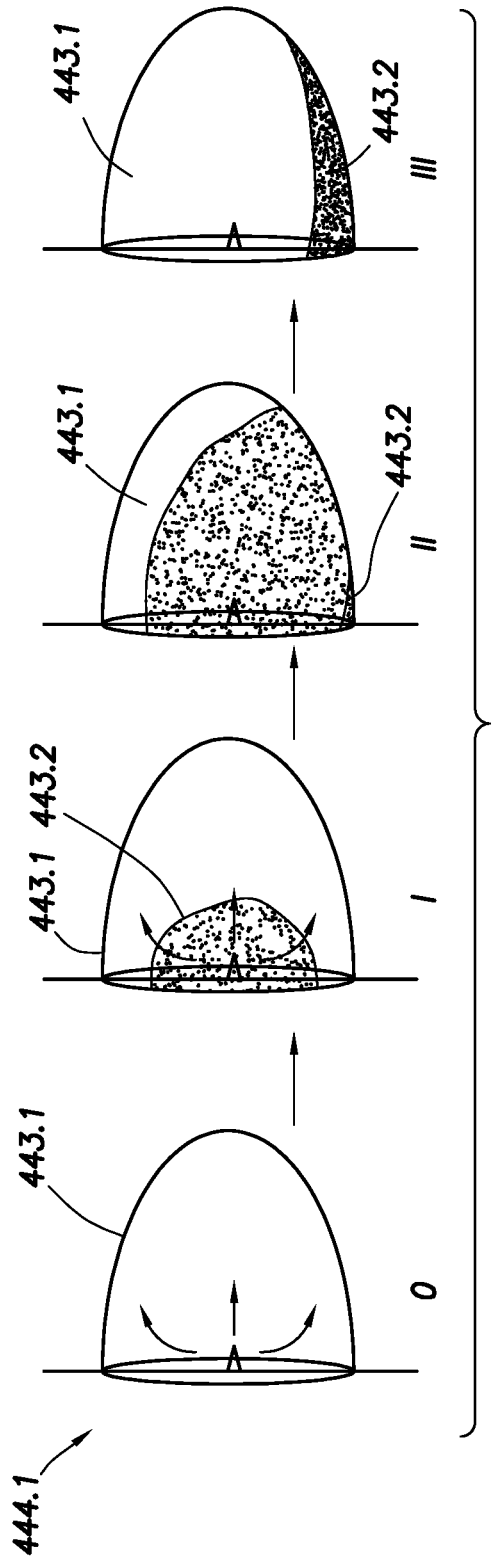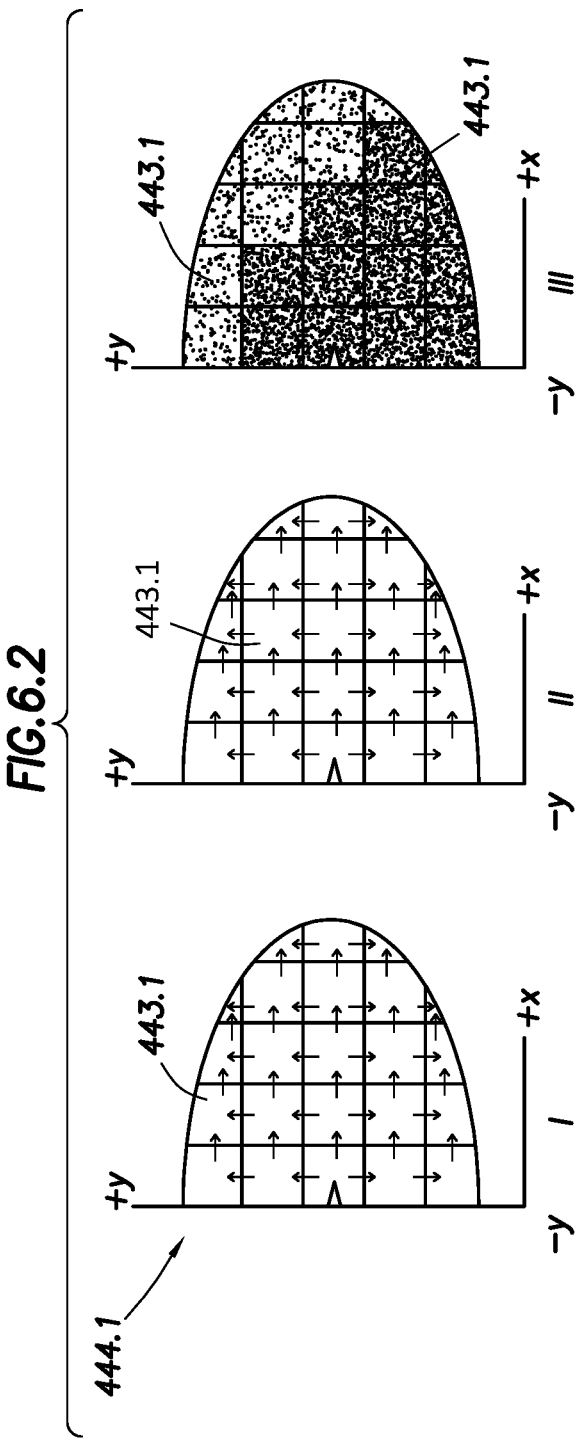
FIG.6.1
FIG.6.2

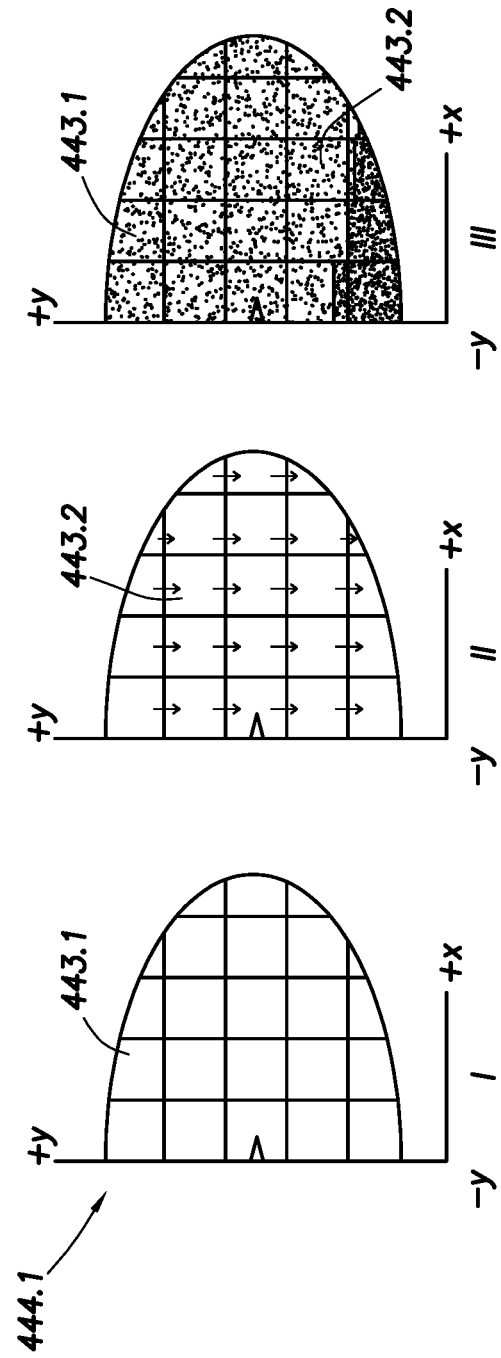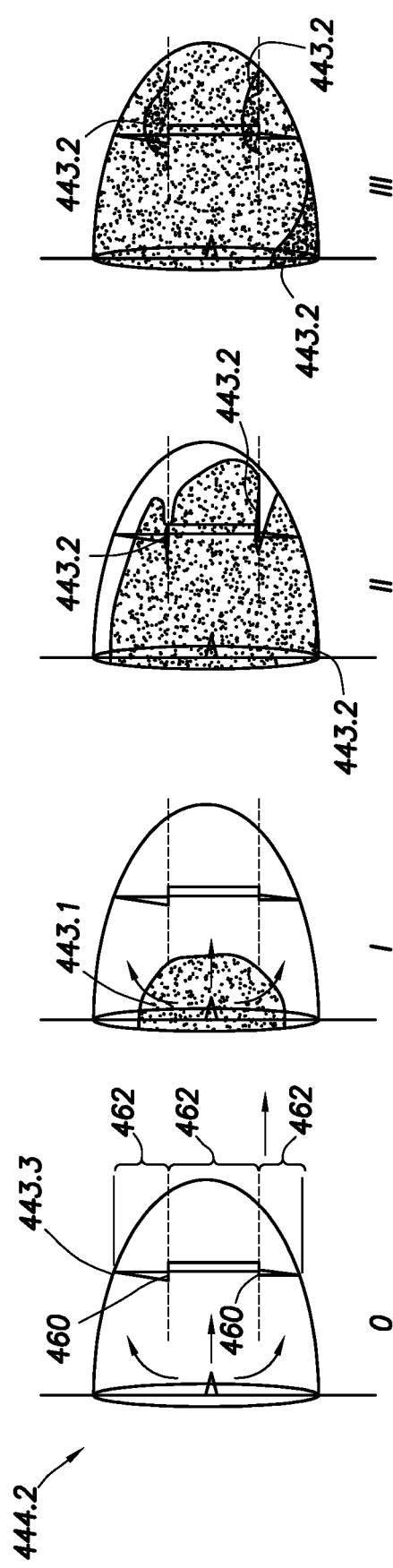

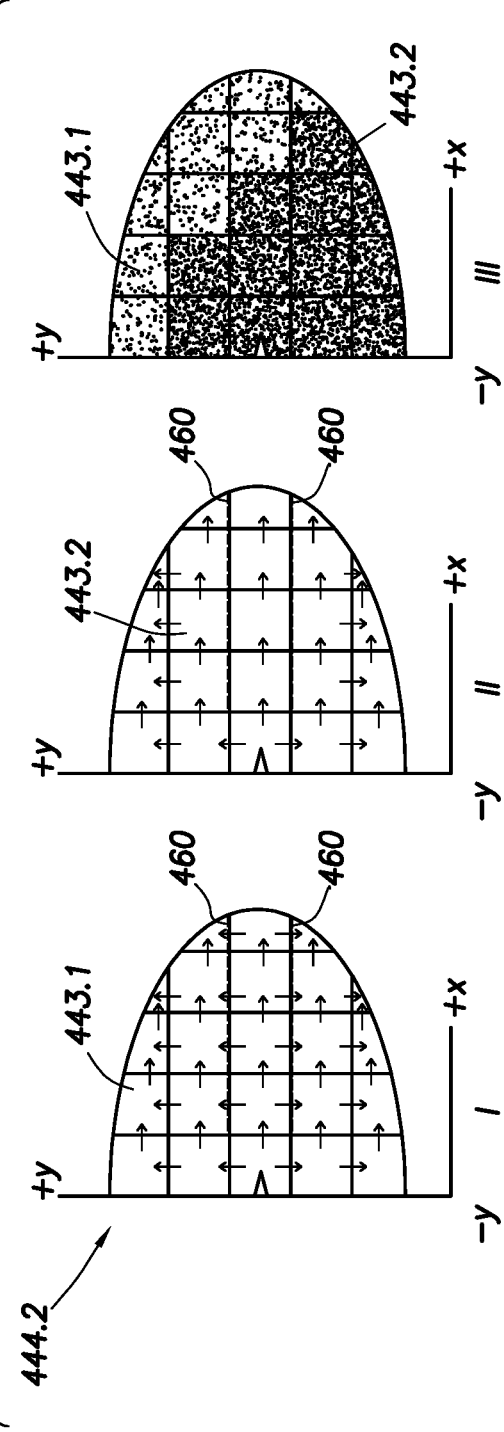
FIG.7.2
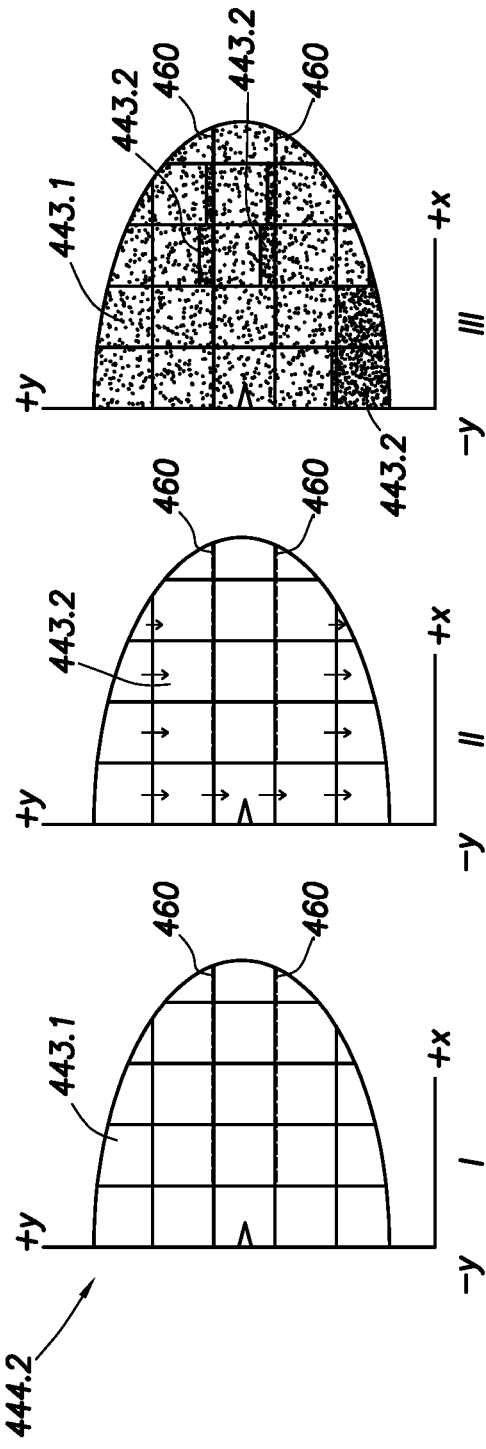
FIG.7.3

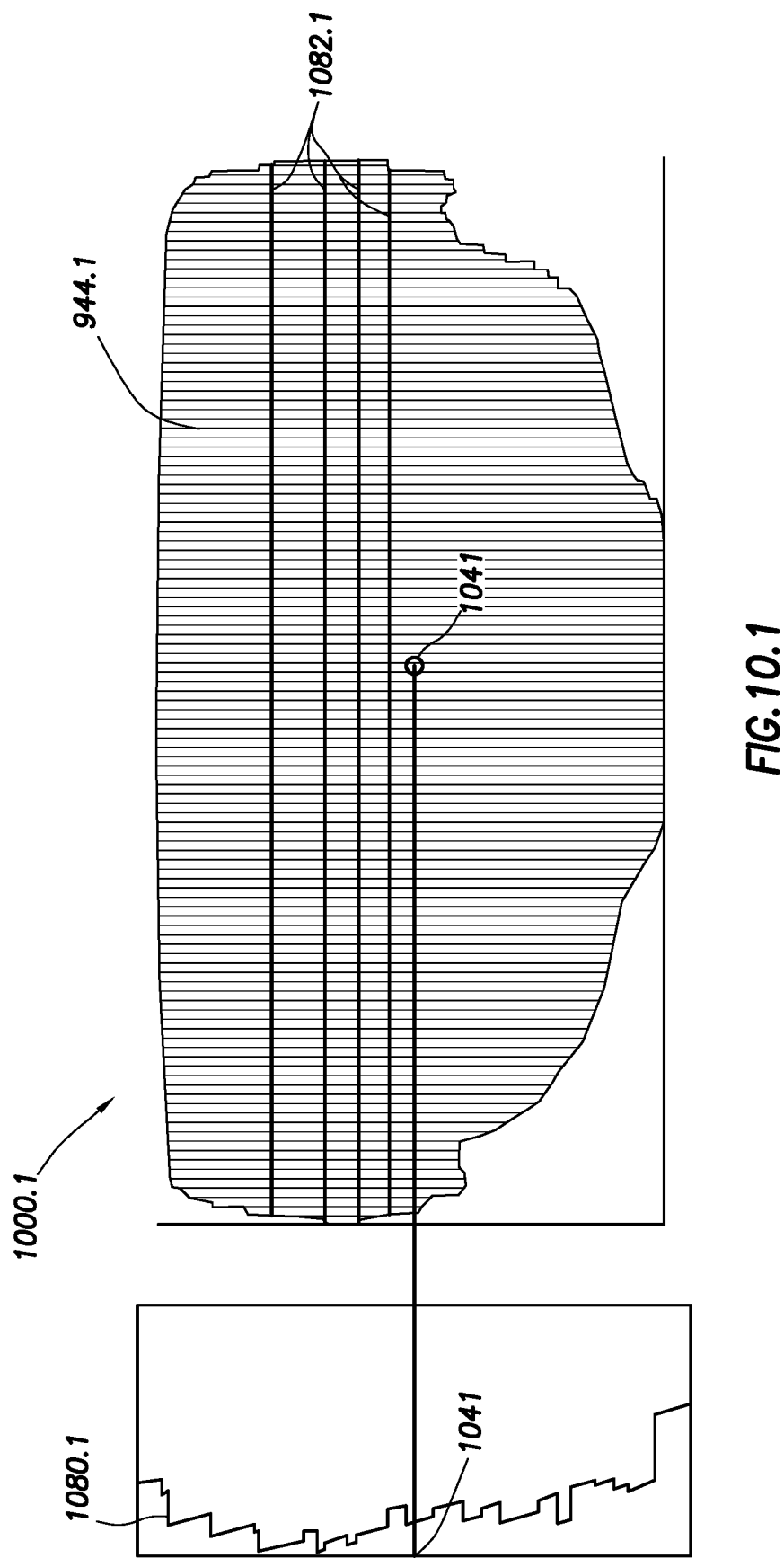
FIG.10.1

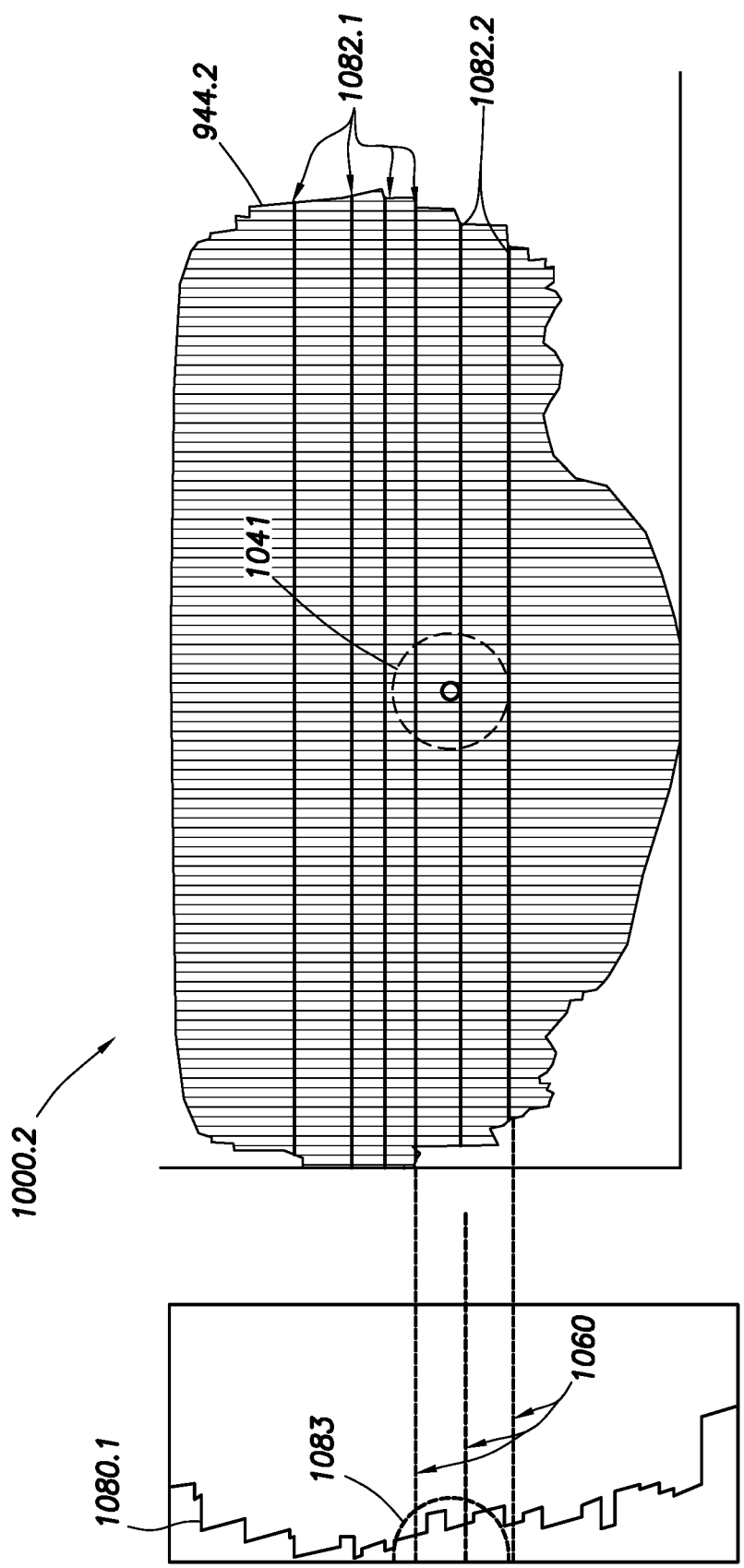
FIG. 10.2

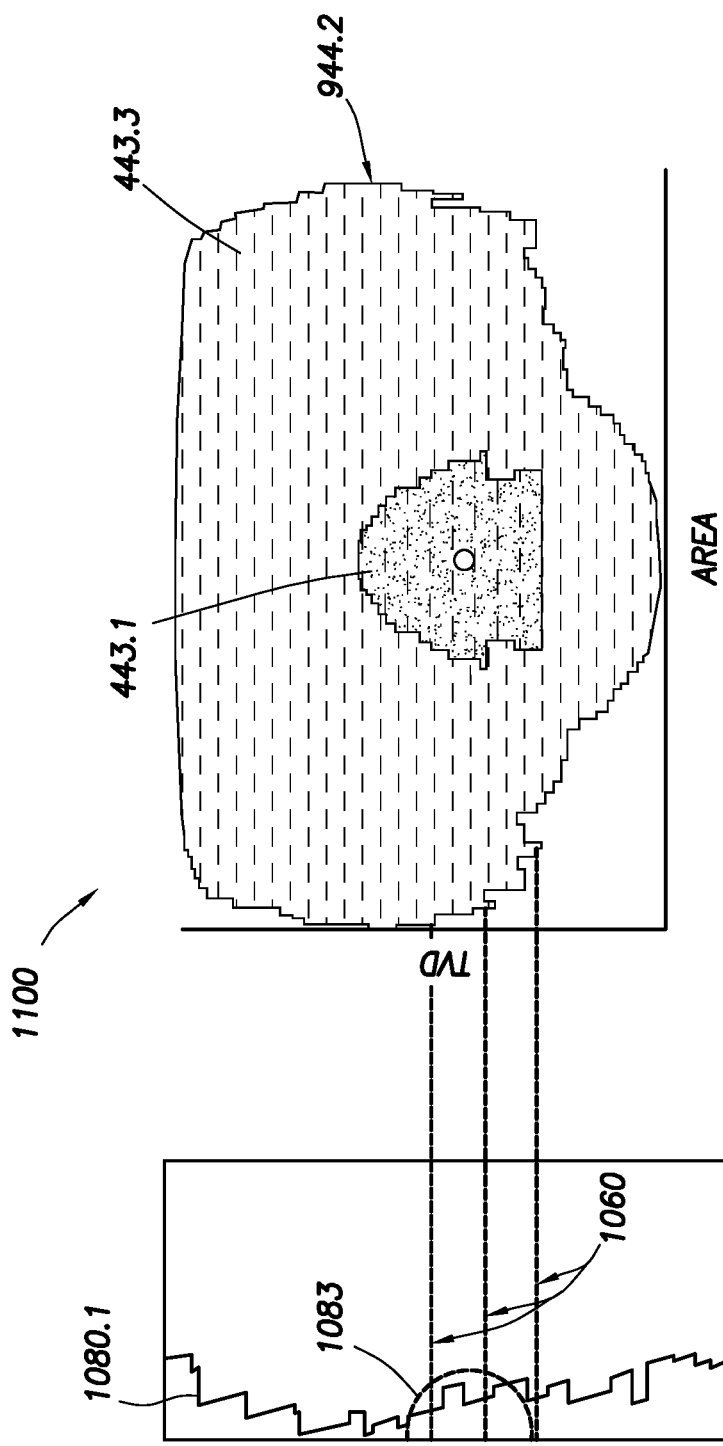
FIG.11.1

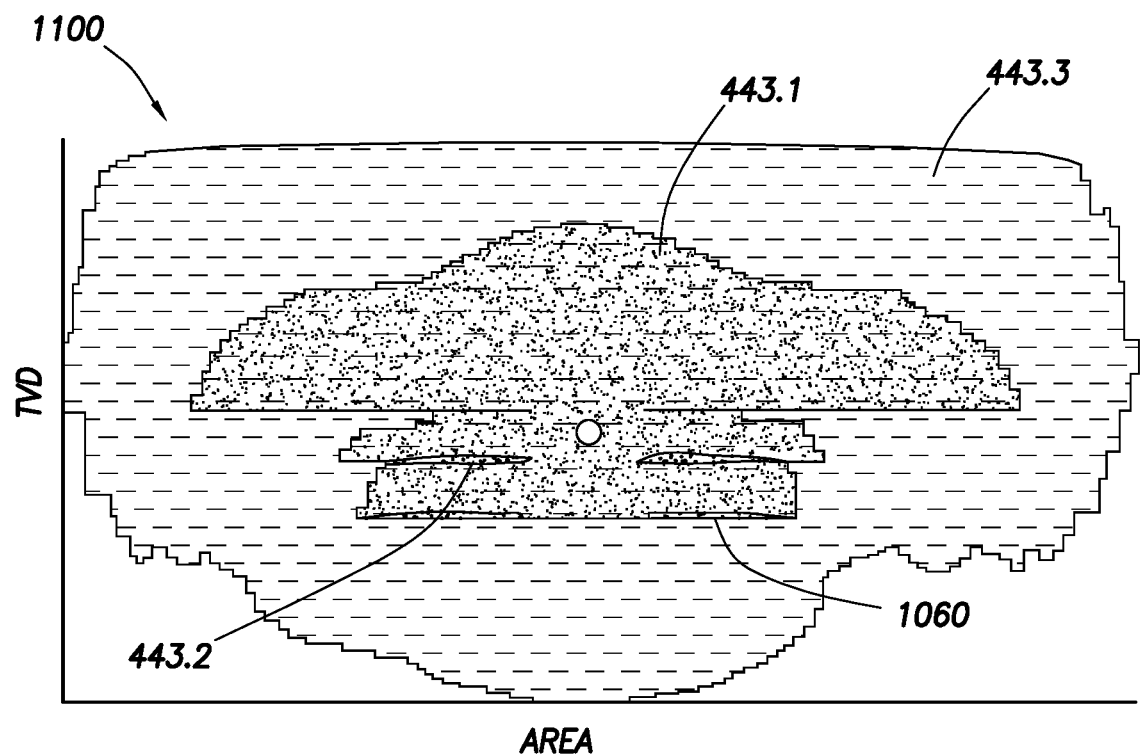
FIG.11.2
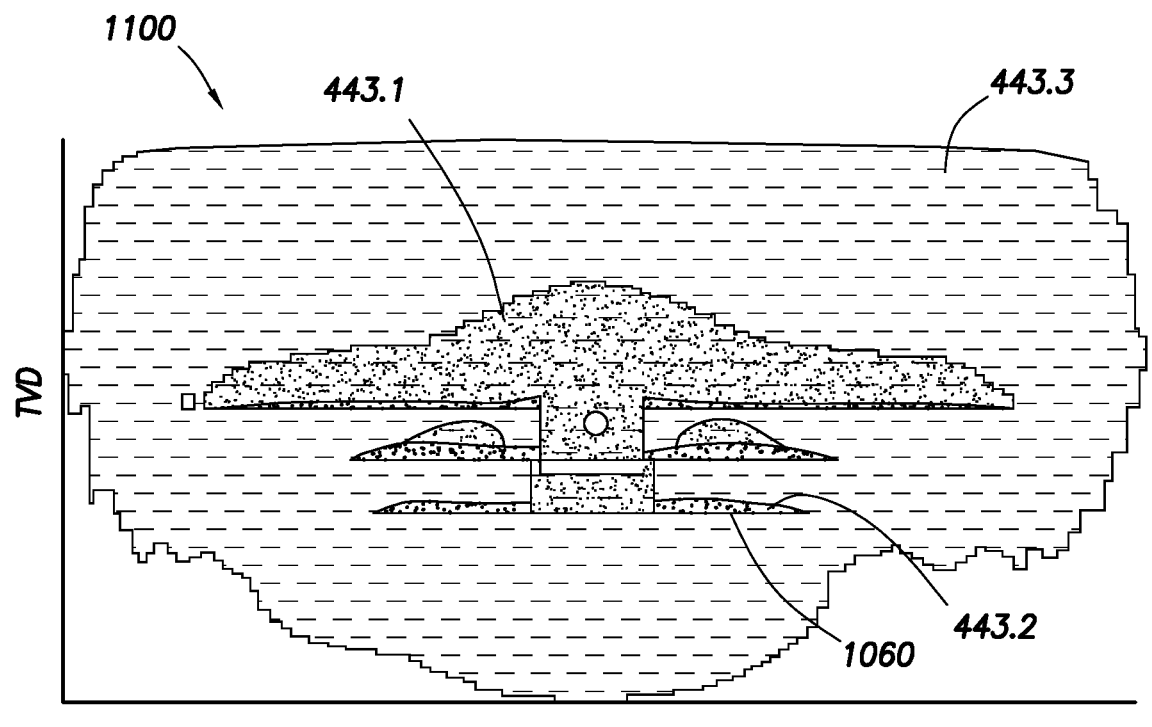
FIG.11.3

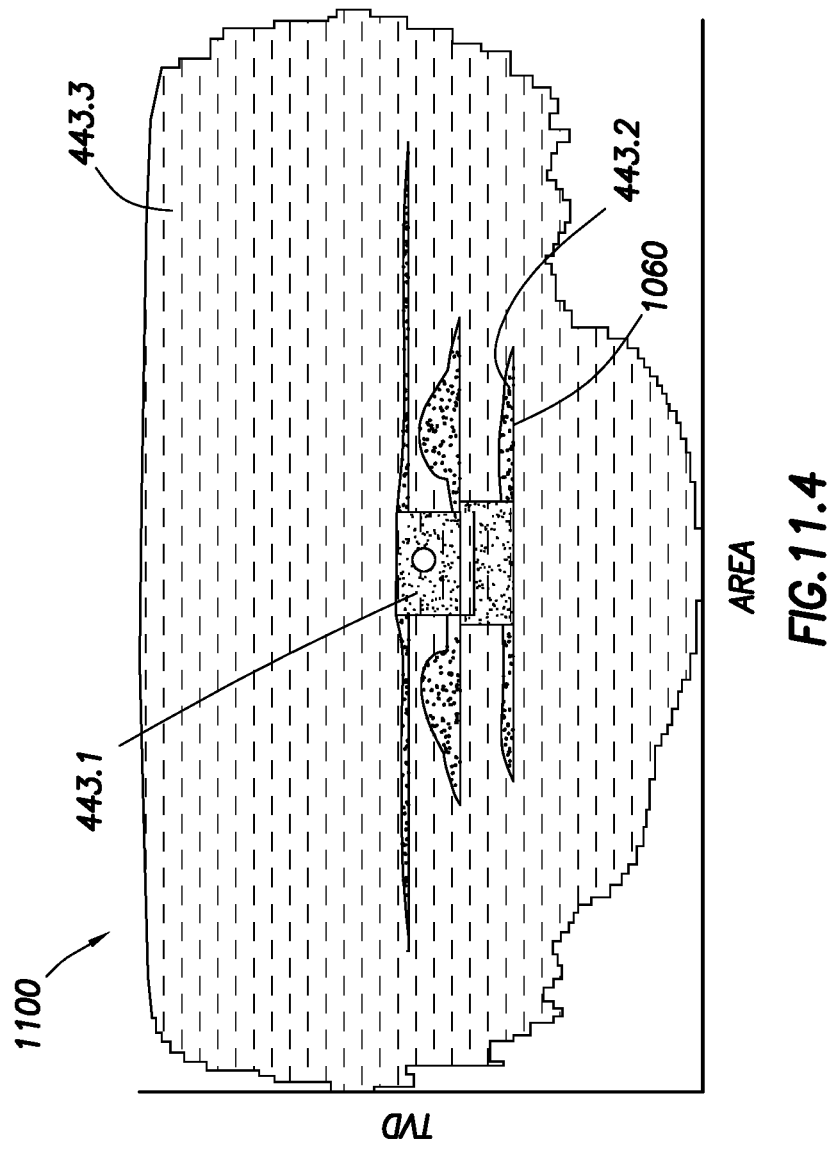
FIG. 11.4

METHOD OF PERFORMING COMPLEX FRACTURE OPERATIONS AT A WELLSITE HAVING LEDGED FRACTURES

CROSS-REFERENCE TO RELATED APPLICATIONS

This application claims the benefit of U.S. Provisional Application No. 62/202,410, filed on Aug. 7, 2015, the entire contents of which are hereby incorporated by reference herein.

BACKGROUND

The present disclosure relates generally to methods and systems for performing wellsite operations. More particularly, this disclosure is directed to methods and systems for performing fracture (or stimulation) operations and/or production operations at a wellsite.

In order to facilitate the recovery of hydrocarbons from oil and gas wells, the subterranean formations surrounding such wells can be stimulated using hydraulic fracturing. Hydraulic fracturing may be used to create cracks in subsurface formations to allow oil or gas to move toward the well. A formation may be fractured, for example, by introducing a specially engineered fluid (referred to as "injection fluid", "fracturing fluid", or "slurry" herein) at high pressure and high flow rates into the formation through one or more wellbores.

Patterns of hydraulic fractures created by the fracturing stimulation may be complex and may form a complex fracture network. Hydraulic fractures may extend away from the wellbore in various directions according to the natural stresses within the formation. Fracture networks may be measured by monitoring seismic signals of the earth to detect subsurface event locations.

Fracture networks may also be predicted using models. Examples of fracture models are provided in U.S. Pat. Nos. 6,101,447, 7,363,162, 7,509,245, 7,788,074, 8,428,923, 8,412,500, 8,571,843, 20080133186, 20100138196, and 20100250215, and PCT Application Nos. WO2013/067363, PCT/US2012/48871 and US2008/0183451, and PCT/US2012/059774, the entire contents of which are hereby incorporated by reference herein.

Despite the advances in fracturing techniques, there remains a need to provide a more meaningful understanding of fracture parameters in order to properly predict and/or design fracture operations to generate desired production at the wellsite. The present disclosure is directed at meeting such need.

SUMMARY

In at least one aspect, the present disclosure relates to a method of performing a fracture operation at a wellsite. The wellsite is positioned about a subterranean formation having a wellbore therethrough and a fracture network therein. The fracture network includes natural fractures. The method involves generating wellsite parameters of the wellsite including seismic measurements, generating smooth fracture parameters of a smooth fracture by solving governing equations for the smooth fracture based on the wellsite parameters, generating ledged fracture parameters of a ledged fracture by identifying ledge locations and solving the governing equations for the ledged based on the wellsite parameters for the ledge locations, and designing the fracture operation for the wellsite based on the ledged fracture parameters.

In another aspect, the present disclosure relates to a method of performing a fracture operation at a wellsite. The wellsite is positioned about a subterranean formation having a wellbore therethrough and a fracture network therein. The fracture network includes natural fractures. The method involves logging seismic measurements of the subterranean formation, generating smooth fracture parameters of a smooth fracture by solving governing equations for the smooth fracture based on the wellsite parameters, and generating ledged fracture parameters of a ledged fracture by identifying ledge locations and solving the governing equations for the ledged based on the wellsite parameters. The method further involves optimizing production of fluids from the subterranean formation by designing fracture operations based on the ledged fracture parameters and fracturing the subterranean formation according to the designed fracture operations.

In another aspect, the present disclosure relates to a method of performing a fracture operation at a wellsite. The wellsite is positioned about a subterranean formation having a wellbore therethrough and a fracture network therein. The fracture network includes natural fractures. The method involves measuring fracture parameters of the subterranean formation, generating smooth fracture parameters of a smooth fracture by solving governing equations for the smooth fracture based on the wellsite parameters, generating ledged fracture parameters of a ledged fracture by identifying ledge locations and solving the governing equations for the ledged fracture based on the wellsite parameters. The method further involves fracturing the formation based on the ledged fracture parameters, and producing fluid from the fractured formation.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the system and method for performing fracture operations involving ledged fractures are described with reference to the following figures. The same numbers are used throughout the figures to reference like features and components.

FIG. 1.1 is a schematic illustration of a wellsite site depicting a fracture operation for generating a subsurface fracture network;

FIG. 1.2 is a schematic illustration of a production operation for generating fluid from subsurface formations via the fracture network;

FIG. 2 is a schematic illustration depicting microseismic monitoring of the fracture network;

FIG. 3.1 is a schematic illustration of the subsurface formation depicting fractures disposed about the subsurface formation;

FIG. 3.2 is a schematic illustration depicting forces applied to a fracture;

FIG. 3.3 is a schematic illustration depicting fracture propagation made by a mode II shear about a wellbore;

FIG. 3.4 is a schematic illustration depicting fractures propagation made by a spiral perforations extending from a wellbore into the subsurface formation;

FIG. 4.1 is a two-dimensional (2D) schematic illustration of geometry of a smooth fracture;

FIG. 4.2 is a 2D schematic illustration of geometry of a ledged fracture;

FIG. 5.1 is a schematic illustration of proppant distribution over time for the smooth fracture;

FIG. 5.2 is a schematic illustration of proppant distribution over time for the ledged fracture;

FIG. 6.1 is a three-dimensional (3D) schematic illustration of proppant distribution over time for the smooth fracture;

FIG. 6.2 is a 3D schematic illustration of the flow of fluid through the smooth fracture;

FIG. 6.3 is a 3D schematic illustration of the flow of proppant through the smooth fracture;

FIG. 7.1 is a 3D schematic illustration of proppant distribution over time for the ledged fracture;

FIG. 7.2 is a 3D schematic illustration of the flow of injection fluid through the ledged fracture;

FIG. 7.3 is a 3D schematic illustration of the flow of proppant through the ledged fracture;

FIG. 10.1 is a graph depicting predicted stacked height growth of the smooth fracture;

FIG. 10.2 is a graph depicting predicted stacked height growth of the ledged fracture; and FIGS. 11.1-11.4 are graphs depicting predicted proppant distribution over time for a ledged fracture.

DETAILED DESCRIPTION

Figure 8:
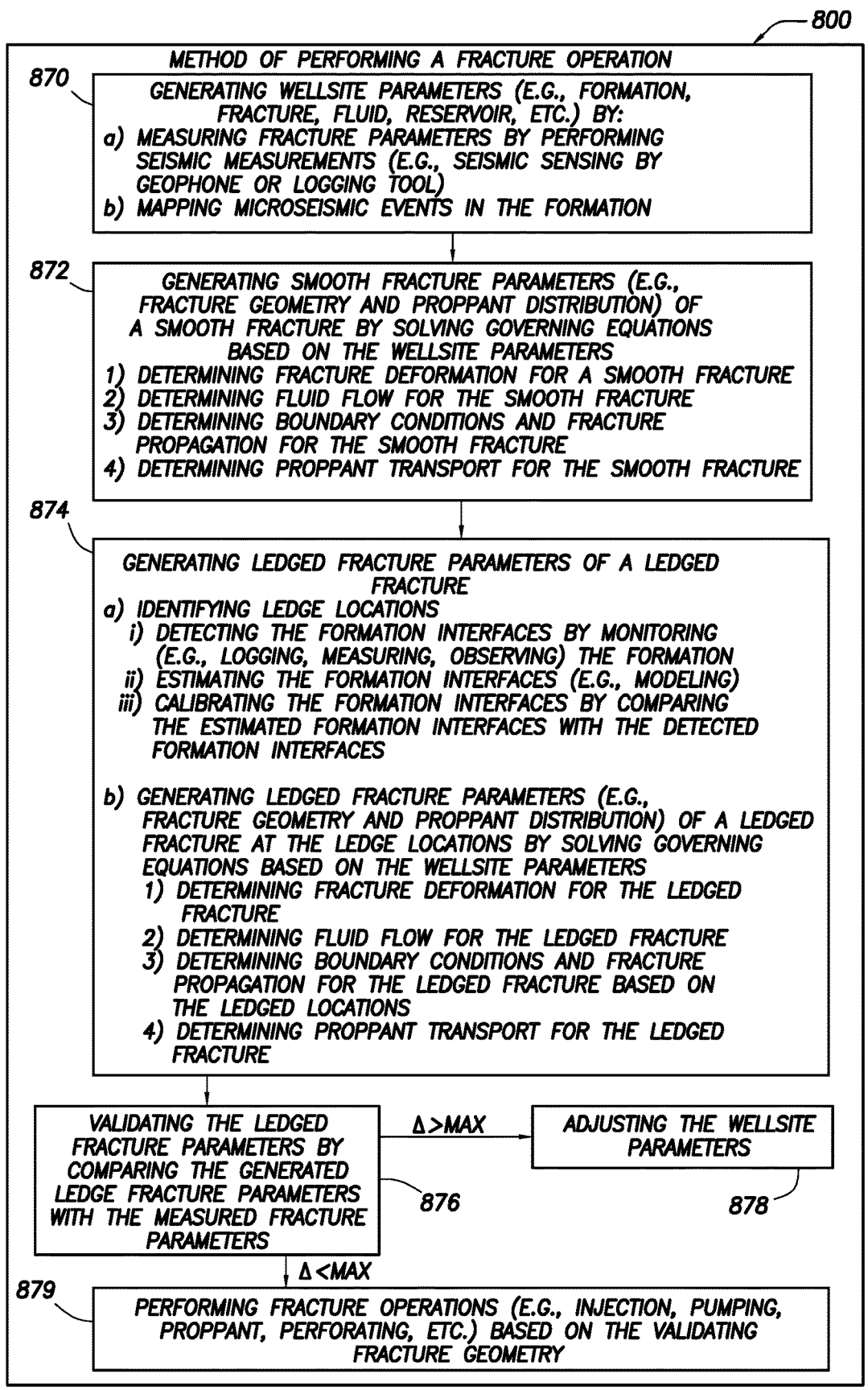
FIG. 8 is a flow chart depicting a method of performing a fracture operation.

The description that follows includes exemplary apparatuses, methods, techniques, and instruction sequences that embody techniques of the inventive subject matter. However, it is understood that the described embodiments may be practiced without these specific details.

The present disclosure relates to techniques for performing wellsite operations, such as fracture operations and production operations. The fracture operations may involve hydraulically fracturing subsurface formations by injecting an injection fluid with proppant into the formation to expand natural fracture networks and create pathways for producing fluid from subsurface reservoirs. The production operations involve passing fluids from subsurface reservoirs, through the fractures and into the wellbore for production to surface locations.

The fracture operations may be performed according to fracture parameters (e.g., fracture geometry) designed to provide sufficient pathways to facilitate production. The fracture operations may be performed based on the assumption that the fractures are smooth (elliptical) fractures. However, ledges may be present in the fractures resulting in changes in fracture and/or production operations. In the near well region, the proppant laden fracturing slurry may or may not pass through the ledges depending on the near well connectivity of the segmented fracture with the wellbore, the induced hydraulic width relative to the size of the ledges, the diameter of the proppant, and/or other factors. At a further distance from the well, fracture width may be restricted at the ledges, possibly preventing proppant from passing through the ledges while pumping or while settling after the treatment ends, which may lead to accumulation of proppant banks on the ledges. Due to the segmentation of the fracture plane by the ledges, the proppant may not travel as far as in a single fracture plane without ledges. The proppant may also not be present over the whole vertical section of the fracture. In both cases, the production performance may be adversely affected.

The present disclosure seeks to provide fracture operations that address the existence of non-smooth fractures with ledges (or steps) and the corresponding impact on fracture and production operations. The ledged fracture operations may take into consideration possible variations in fractures, such as the potential for fractures to have ledges defining pockets along an inner surface of the fracture which may collect proppant from the injection fluid. The smooth and ledge fractures may be compared to validate results and determine potential fracturing issues.

The use of ledge fracture operations seeks to provide a technical improvement over existing fracture operations which fail to appreciate the presence of ledges and the issue of proppant placement in such fractures (e.g., in banks along the ledges). These variations may affect fracture and/or production operations, and may be considered in designing fracture and production operations in an attempt to achieve more efficient operations. The fracture and/or production operations may be optimized by designing fracture operations using validated (or calibrated) ledged fracture parameters to achieve maximum production.

Oilfield Operations

FIGS. 1.1 and 1.2 show example oilfield operations, including fracture and production operations, respectively. The oilfield configurations of FIGS. 1.1-1.2 depict examples of a wellsite 100 and various operations usable with the techniques provided herein. Part, or all, of the oilfield may be on land, water and/or sea. Also, while only fracture and production operations are depicted, one or more of various operations, such as drilling, testing, completion, perforation, and/or other operations, may be performed at one or more wellbores of the wellsite.

FIG. 1.1 shows an example fracture operation involving the injection of fluids into a subterranean formation 102 to expand the fracture network 106 propagated therein. The wellsite 100 has a wellbore 104 extending from a wellhead 108 at a surface location and through the subterranean formation 102 therebelow. The fracture network 106 extends about the wellbore 104. The fracture network 106 includes various fractures positioned about the formation, such as natural fractures 105, as well as hydraulic fractures 107 created during fracturing.

Fracturing is performed by pumping fluid into the formation using a pump system 129. The pump system 129 is positioned about the wellhead 108 for passing fluid through a fracture tool (e.g., tubing) 130.1. The pump system 129 is depicted as being operated by a field operator 127 for recording maintenance and operational data and/or performing maintenance in accordance with a prescribed maintenance plan. The pumping system 129 pumps fluid from the surface to the wellbore 104 during the fracture operation.

The pump system 129 includes a plurality of water tanks 131, which feed water to a gel hydration unit 133. The gel hydration unit 133 combines water from the tanks 131 with a gelling agent to form a gel. The gel is then sent to a blender 135 where it is mixed with a proppant (e.g., sand or other particles) from a proppant transport 137 to form a fracturing (or injection) fluid. The gelling agent may be used to increase the viscosity of the fracturing fluid, and to allow the proppant to be suspended in the fracturing fluid. It may also act as a friction reducing agent to allow higher pump rates with less frictional pressure.

The fracturing fluid is then pumped from the blender 135 to the treatment trucks 120 with plunger pumps as shown by solid lines 143. Each treatment truck 120 receives the fracturing fluid at a low pressure and discharges it to a common manifold 139 (sometimes called a missile trailer or missile) at a high pressure as shown by dashed lines 141. The missile 139 then directs the fracturing fluid from the treatment trucks 120 to the wellbore 104 as shown by solid line 115. One or more treatment trucks 120 may be used to supply fracturing fluid at a desired rate.

Each treatment truck 120 may be normally operated at any rate, such as well under its maximum operating capacity. Operating the treatment trucks 120 under their operating capacity may allow for one to fail and the remaining to be run at a higher speed in order to make up for the absence of the failed pump. A computerized control system may be employed to direct the entire pump system 129 during the fracturing operation.

Various fluids, such as conventional injection fluids with proppants (slurry), may be pumped into the formation through perforations along the wellbore to create fractures. Other fluids, such as viscous gels, "slick water" (which may have a friction reducer (polymer) and water) may also be used to hydraulically fracture shale gas wells. Such "slick water" may be in the form of a thin fluid (e.g., nearly the same viscosity as water) and may be used to create more complex fractures, detectable by seismic activity.

During a fracture treatment, sufficient pad fluid (injection fluid without proppant) may be first pumped to create a sufficiently long fracture to provide effective enhancement to the reservoir flow, followed by slurry to fill the fracture with proppant suspended in the carrier fluid. As pumping ceases, the fluid in the slurry gradually leaks off into the formation, leaving the proppant in the fracture to provide a highly conductive channel to enhance the hydrocarbon production into the well.

Fracture operations may be designed to facilitate production from the wellsite. In particular, injection may be manipulated by adjusting the material (e.g., viscosity, proppant distribution, etc.) being injected and/or the way (e.g., flow rate, pressure, quantity, etc.) the material is injected to achieve the fractures which draw fluid from formations into the wellbore and up to the surface. When a fluid is pumped into a formation at a high rate, the natural permeability of the formation may not be sufficient to accept the injected fluid without requiring extremely high injection pressure, which may lead to the fluid pressure exceeding the minimum in-situ stress to create one or more tensile fractures from the wellbore or perforations. Once a tensile fracture is initiated, the fracture faces may separate and the fracture front may propagate away from the injection point, increasing the fracture length, height and width to create the storage volume for the injected fluid. In order to design the fracture treatment with effective fracture operations to achieve the desired fractures, methods described herein seek to capture the fundamental physics of the fracturing process as is described further herein.

FIG. 1.2 depicts a production operation at the wellsite 100. The production operation is performed by a production tool 130.2 deployed from a production unit or Christmas tree 149 and into the completed wellbore 100 for drawing fluid from the downhole reservoirs into surface facilities 150. Fluid flows from reservoir 152 through perforations in the casing (not shown) and into the production tool 130.2 in the wellbore 104 and to the surface facilities 150 via a gathering network 154.

The wellsite 100 may be provided with sensors (S) to measure wellsite parameters, such as formation parameters (e.g., mechanical properties, petrophysical properties, geological structure, stresses, in situ stress distribution, permeability, porosity, natural fracture geometry, etc.), fracture parameters (e.g., pump rate, volume (e.g., pad fluid and slurry), fracture geometry (e.g., propped fracture length), concentration of the proppant etc.), fluid parameters (e.g., viscosity, composition, proppant, temperature, density, etc.), reservoir parameters (e.g., pressure, temperature, viscosity), equipment parameters, and/or other parameters as desired. The sensors (S) may be gauges or other devices positioned about the oilfield to collect data relating to the various operations. Various sensors (S) may be located at various positions along the wellbore and/or the monitoring tools to collect and/or monitor the desired data. Other sources of data may also be provided from offsite locations.

As schematically shown in FIG. 1.1, the sensors (S) may be part of or include a geophone 147 in an adjacent wellbore 148 and/or a logging tool 153 in the wellbore 108 for measuring seismic activity of the wellsite. The geophone 147, logging tool 153, and/or other tool may be used to detect microseismic events 148 about the fracture network 106 as shown in FIG. 2. These events 148 may be mapped using conventional techniques to determine fracture parameters, such as fracture geometry.

As shown in FIG. 1.2, the sensor (S) may be positioned in the production tool 142.2 or associated equipment, such as the Christmas tree 149, gathering network 154, surface facilities 150 and/or the production facility, to measure fluid parameters, such as fluid composition, flow rates, pressures, temperatures, and/or other parameters of the production operation.

As also schematically shown in FIG. 1.2, the wellsite 100 may be provided with a surface unit 156 for collecting data from the sensors (S). The surface unit 156 may include electronics, such as a processor (or CPU), to collect data and generate data outputs 158. The surface unit 156 may also be provided with communication means, such as antenna 155 as shown or cable connections (not shown), for communicating with the sensors (S) and/or associated equipment.

FIGS. 3.1-3.4 schematically depict mechanisms (e.g., mechanical mechanisms) that may exist in the formation 302 that can lead to variations or discontinuities in natural fractures 342 within the formation. FIG. 3.1 shows the formation 302 with various layers, such as a basal zone 303a, a rubble zone 303b, and an intermediary zone 303c, with the natural fractures 342 extending through these layers. These and other features, such as reservoirs may be present in the formation. These features may affect fracture propagation through the formation.

As demonstrated by FIG. 3.1, the structure of the formation 302 may provide fracture vertical discontinuities at interfaces 343 within the formation 302. Interfaces may be locations within the formations where fractures may be interrupted, such as those depicted in FIG. 3.1. Such interfaces may be any discontinuity (e.g., layer, obstacle, bedding plane, natural fracture, and or a mechanically weak boundary, etc.) capable of interrupting a fracture such that a ledge is created in the fracture.

Discontinuities, such as those depicted in FIG. 3.1 may be generated by various mechanical mechanisms, such as fracture offset that may occur when a hydraulic fracture growing vertically intersects the interfaces 343. Discontinuities may also be present in existing natural fractures that offer a preferred path for the hydraulic fracture to flow.

As shown, the interfaces 343 may occur at a transition between layers in the formation. Intersections may occur between fractures and the interfaces, or between intersecting fractures. Such interfaces and/or intersections may affect fracture behavior. For example, fractures may stop or delay before propagating past an interface. Examples of fracture behavior, such as fracture vertical discontinuity at the interfaces, are observed in the mineback experiments described in Warpinski, N. R., and Teufel, L. W., 1987, Influence of Geologic Discontinuities on Hydraulic Fracture Propagation, SPE Journal of Petroleum Technology 39(2): 209-220. Existing discontinuities or steps in the natural fractures may also provide a preferred path for the hydraulic fracture to follow.

Discontinuities may also result from stresses applied to the fractures. FIG. 3.2 shows various forces, such as gravity, net pressure, stress along a length l of the fracture. These forces are applied to the fractures at the various layers at various depths ($h_1$-$h_5$, $h_{cp}$).

FIGS. 3.3 and 3.4 schematically depict fracture behavior about the wellbore 104 under stress. FIG. 3.3 shows fractures 344.1 generated by rotation of stresses under mode III shear. FIG. 3.4 shows fractures 344.2 generated by spiral perforations. The fractures are also subject to subject to shear forces and spiral forces, respectively, as well as formation stresses $\sigma_{hmax}$ and $\sigma_{hmin}$ present in the formation. Fluid is pumped into the wellbore 104 as indicated by arrow Q, and is pumped through perforations 341 into the formation as indicated by arrows Pdir to create the fractures as shown. As demonstrated by FIGS. 3.3 and 3.4, the configuration of forces may affect the configuration of the fractures as they propagate about the wellbore during fracturing. These and other mechanical mechanisms in the formation may affect fracture propagation and structure of the individual fractures.

FIG. 3.3 shows the fractures 344.1 generated from the fracture stresses along the $K_I$ and $K_{III}$ directions. In this case, a fracture front along the fracture 344.1 breaks into an echelon fracture under mode III shear. As shown by this example, the fracture 344.1 front may split into multiple branches 345 due to rotation of the direction of principal stresses $\sigma_{hmax}$ and $\sigma_{hmin}$ in the formation, resulting in shear stress (Mode III) parallel to the fracture front. Fractures propagate in direction $K_{III}$ and $K_I$ to define the branches 345. This may occur when the initiated fracture first aligns with the perturbed near wellbore stress field and then gradually rotates to align with the far-field in-situ stress as it propagates away from the well. It may also occur if the directions of the in-situ stresses rotate at a distance away from the well.

FIG. 3.4 shows offsetting fractures 344.2 initiated from spiral perforations 341. The spiral perforations 341 adopted in cased and cemented horizontal wells may create offset in the fracture planes originating from different perforations 341 as shown in FIG. 3.4. As shown in this case, the fractures 344.2 extending in multiple directions $P_{dir}$ from the wellbore resulting in multiple fracture wings about the wellbore 104.

Smooth and Ledged Fractures

Fracture operations may be designed based on the assumption that the fractures in the fracture network are smooth. However, the fractures may have discontinuities, such as ledges that occur along interface and/or intersections in the formation (see, e.g., FIG. 3.1). Examples of cases of fractures with discontinuities are described in Suarez-Rivera, R., Behrmann, L., Green, S., Burghardt, J., Stanchits, S., Edelman, E., and Surdi, A., "Defining Three Regions of Hydraulic Fracture Connectivity, in Unconventional Reservoir, Help Designing Completions with Improved Long-Term Productivity", SPE 166505, presented at SPE ATCE, New Orleans, La., 30 Sep.-2 Oct. 2013, and Warpinski, N. R., and Teufel, L. W., "Influence of Geologic Discontinuities on Hydraulic Fracture Propagation (includes associated papers 17011 and 17074)", SPE Journal of Petroleum Technology 39(2): 209-220, 1987, the entire contents of which are hereby incorporated by reference herein.

Discontinuities, such as ledges, may affect fluid flow and influence fracture propagation and dimensions. Discontinuities may also affect transport of proppant in the fracture, and hence the final proppant distribution inside the fracture, which may be responsible for enhancing flow capacity in the reservoir to increase oil/gas production.

FIGS. 4.1 and 4.2 show examples of hydraulic fractures 444.1, 444.2 that may form in the formation during hydraulic fracturing. These fractures are injected with an injection fluid 443.1 having a proppant 443.2 dispersed therein. FIG. 4.1 is a 2D view of an idealized, smooth fracture 444.1 having a symmetric, elliptical shape vertically positioned about a y-axis of a coordinate system. Various points along the 2D fracture, such as a first end at h/2, a second end at −h/2 and a midpoint are extended to an observation point (x,y). Each line L extends at angles $\theta_1$, $\theta_2$ from the points along the 2D fracture to the observation point.

FIG. 4.2 shows a ledged fracture 444.2 that may be generated from the mechanical mechanisms of FIGS. 3.1-3.4 (or other mechanisms). The ledged fracture 444.2 is shown as having an elongate body with three ledges (or steps or discontinuities) 460 defining four fracture portions 462 therealong. As shown by this example, the ledges 460 may extend in either direction from and be at any position along the y-axis. Variations in the number of ledges 460 and dimensions of the fracture portions 462 and/or ledged fracture 444.2 may be generated depending on various wellsite parameters. The structure of the fracture may affect the fracture and/or production operations as is described further herein.

While FIGS. 4.1-4.2 show proppant 443.2 suspended within the fractures 444.1, 444.2, over time, the proppant 443.2 may fall within the fractures due to gravity. Certain injection fluids, such as gels, may have a consistency (e.g., viscosity) sufficient to maintain the proppant 443.2 distributed therein and prevent the proppant 443.2 from falling with gravity. In such cases, the proppant 443.2 may remain distributed throughout the fracture as shown in FIGS. 4.1 and 4.2.

FIGS. 5.1-7.3 show example behavior over time of the injection fluid 443.1 and proppant 443.2 in smooth and ledged fractures. FIGS. 5.1-5.2 show 2D views of example behavior of the injection fluid 443.1 and proppant 443.2 in the smooth (planar) fracture 444.1 and a complex fracture 444.2 with ledges 460, respectively. FIGS. 5.1 and 5.2 schematically illustrate the proppant distribution in a vertical cross-sectional view of a hydraulic fracture system, for a planar fracture (FIG. 5.1) and for a complex fracture system with ledges (FIG. 5.2). Examples of proppant distribution in fractures may be found at Cipolla, C. L., Warpinski, N. R., Mayerhofer, M. J., Lolon, E. P., and Vincent, M. C., 2010, "The Relationship Between Fracture Complexity, Reservoir Properties, and Fracture-Treatment Design", SPE 115769 presented at SPE ATCE, Denver, Colo., 21-24 Sep. 2010, the entire contents of which is hereby incorporated by reference herein (hereafter "Cipolla 2010").

FIGS. 6.1-7.3 show additional views of the behavior of the injection fluid 443.1 and proppant 443.2 in the smooth fracture 444.1 and the ledged fracture 444.2. FIGS. 6.1-7.3 shows proppant distribution in the fracture from a side view of the fracture, with the proppant placement at four different times of the fracturing treatment: 1) Stage 0—the pad when no proppant has been injected yet, 2) Stage I—during pumping of slurry, 3) Stage II—at end of pumping with the proppant not fully settled, and 4) Stage III—the end of shut-in when all the proppant has settled.

As shown by FIG. 5.1, injection fluid 443.1 passing through the smooth fracture 444.1 falls to a lower portion of the fracture over time. Initially, the proppant 443.2 is assumed to distribute throughout the fracture 444.1 (e.g., during pumping) as shown schematically as stage I. In this example, the injection fluid 443.1 has a viscosity sufficient to allow proppant 443.2 to freely move therein, thereby causing the proppant 443.2 to fall within the fracture with gravity. Over time, the proppant 443.2 in the fracture gravitationally falls from a top portion of the fracture and settles to a bottom portion of the fracture (e.g., during shut-in) as schematically shown as stage II. After the proppant vacates the upper portion of the fracture, the upper portion of the fracture closes under pressure. The lower portion of the fracture may remain propped open by the proppant 443.2 therein as schematically shown as stage III.

FIG. 6.1 shows a 3D view of the smooth fracture 444.1 over time during injection. In this view, FIG. 6.1 shows the fracture 444.1 during stage 0 (pad) during injection of clean fracture fluid (pad) 443.3 into the smooth fracture 444.1, stage I (pumping) injection of a mixture of injection fluid 443.1 (e.g., the clean fracture fluid 443.3 with proppant 443.2) into the smooth fracture 444.1, stage II (end of pumping) after injection stops and settling of the mixture starts within the smooth fracture 444.1, and at stage III (end of shutin) after settling of the proppant 443.2 from the clean fracture fluid 443.3 mixture within the smooth fracture 444.1. In stage 0, a high pressure injection of fracturing fluid from the well to the reservoir initiates and propagates a hydraulic fracture. In stage I, the injection of a mixture of slurry fills the fracture with proppants. Because the proppant has a greater density than the fracturing fluid, the proppant settles at the bottom of the fracture as shown in stage II. After pumping, all the proppant settles as shown in stage III. As shown by FIGS. 6.1, the process of fracturing involves a process of proppant placement within the fracture.

FIG. 6.2 shows velocity fields for the fluid 443.1 and the proppant 443.2 as the fluid is pumped into the smooth fracture 444.1 during stage I. As shown by this figure, during pumping, both the fracture fluid 443.1 and the proppant 443.2 have similar velocity fields moving in the +x, +y, and −y direction. As shown by FIG. 6.2, the proppant movement inside the fracture may be based on the velocity field given by a previous calculation of the pressure field. The velocity field for proppant may be similar to the velocity field for the fracturing fluid, except that it considers an addition downward velocity component due to settling. Once the proppant has reached the bottom of the fracture, it may accumulate into a proppant bank where proppant remains static.

FIG. 6.3 shows velocity fields for the fluid 443.1 and the proppant 443.2 at the end of pumping during stage II. As shown by this figure, after pumping, the velocity field of the fracture fluid 443.1 is stationary, and the velocity field of the proppant 443.2 moves in the −y direction due to gravity. As shown by FIG. 6.3, when the pumping stops, the velocity field for the fluid stops, and the velocity field for the proppant includes the settling velocity.

FIGS. 5.2 and 7.1-7.3 show fluid behavior as affected by the ledges 460 in the ledged fracture 444.2. The ledge fracture 444.2 as depicted has a similar behavior to the smooth fracture 444.1 during the fracture stages, except that the ledges affect the movement of the proppant 443.2 over time. In the ledged case, injection fluid 443.1 passing through the ledged fracture 444.2 falls to a lower portion of each section 462 of the fracture over time as shown in stage II. Because the proppant is distributed through sections of the fracture, the fracture 443.2 remains propped open by the proppant 443.2 therein as schematically shown as stage II of FIG. 5.2.

As shown in the 3D view of FIG. 7.1, as the slurry is injected, the flow changes as the slurry reaches the ledges 460. During stage II, the slurry passes around the ledges, and the proppant 443.2 settles at the bottom of each section 462 of the fracture 444.2. After pumping (during stage III), portions of the proppant settles along the ledges 460 and the bottom of the fracture 444.2. As shown by FIGS. 7.1, the placement of proppant changes due to the presence of the ledges within the fracture 444.2.

As shown in FIG. 7.2, the velocity field of the fluid is similar to that of FIG. 6.2. However, as shown in FIG. 7.3, the velocity field for the proppant is changed in the areas adjacent the ledges 460.

As demonstrated by FIGS. 5.1-7.3, ledges may create a discontinuity following the layering of the reservoir (e.g., horizontal) that may allow the fracturing fluids to flow through, but prevent the proppant from flowing. Because ledges are physical barriers to proppant, the ledges may modify the proppant placement inside the fracture. Unlike the settling shown in the smooth fracture 444.1 of FIG. 6.1, when proppant 443.2 located above a ledge 460 settles in a ledged fracture 444.2 as shown in FIG. 7.1, the proppant accumulates on top of the ledges, and not at the bottom of the proppant. In particular, the settling of proppant above ledges creates a proppant bank on the ledges.

As also demonstrated by FIGS. 5.1-7.3, the existence of ledges 460 in the fracture 444.2 may affect the fluid flow path and may influence fracture propagation and its dimensions. As a result, the ledges 460 may effect transport of the proppant in the fracture 444.2, and hence the final proppant distribution inside the fracture. In at least some cases, such distribution may be responsible for enhanced flow capacity in the reservoir to increase oil or gas production. In other cases, proppant transport may be affected by the ledges where the ledges are offset from each other and have very small or no opening width to allow proppant to pass through, and which may prevent proppant from passing through ledges and/or accumulating along the ledges. Such characteristics of ledged fractures may be considered in the design and performance of fracture operations and/or production operations.

Complex Fracture Operations

Fracture operations may be performed based on an assumption that the fracture network contains smooth fractures. More complex fracture operations may also be performed that take into consideration the presence and effect of ledges on the fracturing and production operations. The methods provided herein seek to advance fracture and production operations by detecting the existence and the locations of ledges in an effort to provide more effective fracturing design and to optimize the completion and treatment parameters to achieve maximum production.

FIG. 8 is a flow chart depicting a method 800 of performing fracture operations at a wellsite (and/or formation) having ledge fractures. The method 800 involves 870 generating wellsite parameters. The wellsite parameters may include, for example, formation parameters (e.g., mechanical properties, petrophysical properties, geological structure, stresses, in situ stress distribution, permeability, porosity, natural fracture geometry, etc.), fracture parameters (e.g., pump rate, volume (e.g., pad fluid and slurry), fracture geometry (e.g., propped fracture length), concentration of the proppant etc.), fluid parameters (e.g., viscosity, composition, proppant, temperature, density, etc.), reservoir parameters (e.g., pressure, temperature, viscosity), equipment parameters, and/or other parameters as desired. Such parameters may be gathered from historical, customer, other wellsites, measurements, and/or other sources. Various combinations of such parameters may affect hydraulic fracturing many, such as formation mechanical and petrophysical properties, in-situ stress distribution, wellbore configuration and completion, fracturing fluid rheological properties (as a function of temperature, time of exposure to a temperature, and proppant concentration), pumping schedule that comprises is comprised of a sequence of pumping steps with a combination of different pump rates, volume, types of fluid and proppant, and proppant concentration, dimensions and locations of natural fractures and their properties.

The generating 870 may involve measuring the wellsite parameters at the wellsite, for example, by deploying a downhole tool into the wellbore to perform measurements of subsurface formations. For example, as shown in FIG. 1.1, measuring may be performed, for example, using a geophone, logging, and/or other tool to take seismic measurements and/or sense seismic anomalies in the formation. The stimulation treatment may generate the microseismic events as shown in FIG. 2. These microseismic events may be mapped using conventional techniques as is understood by one of skill in the art.

I. Smooth Fracture Operations

The method 800 may involve 872—generating smooth fracture parameters (e.g., fracture geometry and proppant distribution) for a smooth fracture. This generating 872 may be performed using known properties of the formation applied to the idealized estimate of the smooth fracture of FIGS. 4.1, 5.1, and 6.1-6.3. The generating 872 may involve solving governing equations for the smooth fracture using wellsite parameters generated at 870. In a first example, the basic governing (or continuity) equations may define constraints for the smooth fracture including: 1) fracture deformation, 2) fluid flow, 3) boundary conditions and fracture propagation, and 4) proppant transport.

The 1) fracture deformation may predict the amount of the fracture opening that is generated by fracturing. Hydraulic fracture propagates normal to the minimum in-situ stress in the formation (see, e.g., FIGS. 3.3 and 3.4). The fluid pressure exceeds the minimum in-situ stress in order to create the separation of the fracture faces (i.e. the opening width) to accept the fluid. The higher the net pressure (i.e. the fluid pressure minus the minimum in-situ stress), the wider the fracture width and the more conductive the fracture may be to the fluid being injected into the fracture.

The amount of fracture opening created by a given net fluid pressure depends on several factors, such as the stiffness of the rock and the dimensions of the hydraulic fracture itself. For a planar fracture in an elastic medium, the 3D fracture problem can be reduced to a 2D integral equation over the fracture plane:

$$p(x,y) - \sigma_h(x,y) = \int_A C(x,y,x',y')w(x',y')dx'dy' \quad (1)$$

where $p(x, y)$ is the fluid pressure, $\sigma_h(x, y)$ is minimum in-situ stress normal to the fracture face, $w(x',y')$ is fracture opening width, $C(x,y,x',y')$ is a complex stiffness function, and A is the surface area of the fracture.

Hydraulic fracture models may be used to compute the fracture opening width from the elasticity equation (1) with different degrees of simplification or approximation. These simplifications may consider solving elasticity and flow equations (discussed further herein) together. A specific 2D solution of equation (1) for a fracture in a layered formation with piece-wise constant stress may be used:

$$w(y) = \frac{4}{E'}\left[p_{cp} - \sigma_n + \rho_f g\left(h_{cp} - \frac{h}{4} - \frac{y}{2}\right)\right]\sqrt{y(h-y)} + \quad (2)$$

$$\frac{4}{\pi E'}\sum_{i=1}^{n-1}(\sigma_{i+1}-\sigma_i)\left[(h_i-y)\cosh^{-1}\frac{z\left(\frac{h-2h_i}{h}\right)+h_i}{|z-h_i|} + \sqrt{y(h-y)}\arccos\left(\frac{h-2h_i}{h}\right)\right]$$

where w is the width profile, h is the height of the fracture, $h_i$ is the height of the top of layer i (measured from the bottom of the fracture), $p_{cp}$ is the pressure at the height $h_{cp}$, $\sigma_i$ is the normal stress to the fracture in layer i and $\rho_f$ the fracturing fluid density for a fracture having dimensions as shown, for example, in FIG. 4.3. Using the known wellsite parameters (870), the 2D solution may provide an initial estimation of the fracture deformation.

The 2) fluid flow through the fracture may be determined based on known fluid properties. The fluid flow in the fracture satisfies mass conservation principles, namely that, for any given unit area inside the fracture, the net fluid influx into the area equals the increase of the fracture volume, minus the fluid loss into the formation. In a planar fracture, the mass balance equation for an incompressible fracturing fluid may be expressed as:

$$\frac{\partial w}{\partial t} + \frac{\partial q_x}{\partial x} + \frac{\partial q_y}{\partial y} + q_l = 0 \quad (3)$$

$q_x$ is the flow rate in the horizontal direction (x-axis), $q_y$ is the flow rate in the vertical direction (y-axis), $q_l$ is the leak off rate from the fracture to the reservoir through the fracture walls, t is time, x is space in the horizontal direction, and y is space in the vertical direction.

Fluid flow also satisfies the equation for conservation of momentum, or the so-called lubrication equation that relates the flow rate and pressure gradient in the fracture:

$$\frac{\partial p}{\partial s} = -\frac{2k}{w^{2n+1}}\left(\frac{4n+2}{n}\right)^n q_s|q|^{n-1} \quad (4)$$

where k is the flow consistency index, n is the flow behavior index, p is the pressure, and s is space (e.g., in the x or y direction). The n and k are power-law and consistency indices of the fracturing fluid may be assumed to have a power-law rheological behavior.

Combining Eq. (3) and Eq. (4), by eliminating q's, leads to a single equation in pressure p and width w. As mentioned previously, this equation must be solved simultaneously with the fracture width equation to obtain p and w. In a simplified model where the flow is considered 1D in the horizontal direction, the mass balance equation Eq. (3) becomes:

$$\frac{\partial q}{\partial s} + \frac{\partial (H_{fl}\overline{w})}{\partial t} + q_l = 0,$$ (5)

$$q_l = \frac{2h_l c_t}{\sqrt{t - \tau(s)}}$$

where $H_{fl}$ is the height of the fracture filled with fluid or slurry (without containing the proppant bank), $\overline{w}$ is the average width of the fracture cross section (average along the vertical axis y), $c_t$ is the leak off coefficient, $h_t$ is the leak off height (often equal to the fracture height), τ is the time when the fracture was created at the location s, $h_l$ is the height of leak-off zone and the time when the element of the fracture is first exposed to the fracture fluid.

In addition, the global volume balance must be satisfied:

$$\int_0^t Q(t)dt = \int_0^{L(t)} H\overline{w}ds + \int_{H_L}\int_0^{L(t)}\int_0^t q_L \, dtdsdh_l$$ (6)

where Q(t) is the pump rate (e.g., the total rate to the injected in the fracture at the time t), L(t) is the total length of the entire fracture at time t, and H(s,t) is the fracture height. The lubrication equation Eq. (4) becomes:

$$\frac{\partial p}{\partial s} = -\alpha_0 \frac{1}{\overline{w}^{2n'+1}} \frac{q}{H_{fl}} \left|\frac{q}{H_{fl}}\right|^{n'-1}$$ (7)

$$\alpha_0 = \frac{2K'}{\phi(n')^{n'}}\left(\frac{4n'+2}{n'}\right)^{n'};$$

$$\phi(n') = \frac{1}{H_{fl}} \int_{H_{fl}} \left(\frac{w(z)}{\overline{w}}\right)^{\frac{2n'+1}{n'}} dz$$

where p is fluid pressure, q the local flow rate in the fracture, $H_{fl}$ height of the part of the fracture open to fluid flow, $\overline{w}$ the average width, s the distance along the fracture, n' and K' are fluid power-law and consistency indices, respectively, and z corresponds to y in previous equation (vertical axis).

Using the known wellsite parameters (870) with these fluid flow equations, an initial estimation of the fluid flow through the fracture may be provided. Modeling may be used to simulate fluid flow through the fracture and determine velocity fields using gridding as demonstrated by FIG. 6.2.

The 3) boundary conditions and fracture propagation may be determined by considering the fracture front. As fluid is injected into the fracture, the fracture opening width and size (length and/or height) increase accordingly. The internally applied net pressure causes the rock ahead of the fracture tip to become tensile.

For solid materials, the material's resistance to fracture propagation may be quantified by a critical stress intensity factor, also referred to as fracture toughness, KIc. The fracture front propagates when the stress intensity factor at the tip induced by the internal pressurization becomes equal to the fracture toughness. This condition is maintained as the fracture front advances as represented by:

$$KI=KIc$$ (8)

This condition is satisfied at the fracture front. Additionally, the following boundary conditions apply:

$$w=0 \text{ and } q=0$$ (9)

Using the known wellsite parameters (870) with these fluid flow equations (Equations 3-6), a tip position of the fracture may be determined which satisfy Eq. (8) and (9) and to satisfy the overall mass balance.

The 4) proppant transport may be determined using fluid flow properties. Once the fluid pressure distribution in the fracture is solved from the coupled elasticity-flow equations (Eq. 2 and 7), the flow velocity field may also be obtained. The proppant transport in the fracture may also be solved from the transport equation:

$$\frac{\partial(cw)}{\partial t} + \nabla \cdot (cwv_p) = 0$$ (10)

where c is the volume concentration of the proppant, and $v_p$ is the velocity of proppant.

Due to the density of the proppant particles being heavier than the carrier fluid, proppant settles vertically under gravity relative to the fluid. Stokes' Law may be used to compute single particle settling velocity:

$$v_{s0} = \left[\frac{(\rho_p - \rho_f)gd_p^{n+1}}{3^{n-1}18k}\right]^{1/n}$$ (11)

where $v_{s0}$ is the single particle settling velocity, $\rho_p$ and $\rho_f$ are the density of the proppant and fluid, respectively, g is gravity, and $d_p$ is the proppant particle diameter.

Using the known wellsite parameters (870) and the coupled elasticity-flow equations (Eq. 2 and 7), fracture parameters, such as the fracture geometry and proppant transport, may be determined. Additional correction factors can be introduced to account for the effect of proppant concentration and the width of the fracture on settling velocity, such as the settling of proppant to create proppant banks, the accumulation of proppant at the bottom of the fracture, etc. Modeling may be used to simulate proppant transport through the fracture and determine velocity fields using gridding as demonstrated by FIG. 6.3.

In a second example, another version of the basic governing equations for each of the following is provided: I) fluid flow in the fracture network, II) fracture deformation, and III) the fracture propagation/interaction criterion. In this example, the fluid flow in the fracture network is determined using equations that assume that fluid flow propagates along a fracture network with the following mass conservation:

$$\frac{\partial q}{\partial s} + \frac{\partial (H_{fl}\overline{w})}{\partial t} + q_L = 0$$ (12)

where q is the local flow rate inside the hydraulic fracture along the length, $\overline{w}$ is an average width or opening at the cross-section of the fracture at position s=s(x,y), $H_{fl}$ is the height of the fluid in the fracture, and $q_L$ is the leak-off volume rate through the wall of the hydraulic fracture into the matrix per unit height (velocity at which fracturing fluid infiltrates into surrounding permeable medium) which is expressed through Carter's leak-off model. The fracture tips propagate as a sharp front, and the length of the hydraulic fracture at any given time t is defined as l(t).

The properties of driving fluid may be defined by power-law exponent n' (fluid behavior index) and consistency index K'. The fluid flow could be laminar, turbulent or Darcy flow through a proppant pack, and may be described correspondingly by different laws. For the general case of 1D laminar flow of power-law fluid in any given fracture branch, the Poiseuille law (see, e.g., Nolte, 1991) may be used:

$$\frac{\partial p}{\partial s} = -\alpha_0 \frac{1}{w^{2n'+1}} \frac{q}{H_{fl}} \left| \frac{q}{H_{fl}} \right|^{n'-1} \quad (13)$$

where $$\alpha_0 = \frac{2K'}{\phi(n')^{n'}} \cdot \left( \frac{4n'+2}{n'} \right)^{n'};\quad (14)$$

$$\phi(n') = \frac{1}{H_{fl}} \int_{H_{fl}} \left( \frac{w(z)}{\overline{w}} \right)^{\frac{2n'+1}{n'}} dz$$

Here w(z) represents fracture width as a function of depth at current position s, α is a coefficient, n' is power law exponent (fluid consistency index), φ is shape function, and dz is the integration increment along the height of the fracture in the formula.

Fracture width may be related to fluid pressure through the elasticity equation. The elastic properties of the rock (which may be considered as mostly homogeneous, isotropic, linear elastic material) may be defined by Young's modulus E and Poisson's ratio v. For a vertical fracture in a layered medium with variable minimum horizontal stress $\sigma_h(x, y, z)$ and fluid pressure p, the width profile (w) can be determined from an analytical solution given as:

$$w(x,y,z) = w(p(x,y),H,z) \quad (15)$$

where w is the fracture width at a point with spatial coordinates x, y, z (coordinates of the center of fracture element), and p(x,y) is the fluid pressure, H is the fracture element height, and z is the vertical coordinate along fracture element at point (x,y).

Because the height of the fractures may vary, the set of governing equations may also include the height growth calculation as described, for example, in Kresse, O., Cohen, C., Weng, X, Wu, R., and Gu, H. 2011, *Numerical Modeling of Hydraulic Fracturing in Naturally Fractured Formations. 45th US Rock Mechanics/Geomechanics Symposium*, San Francisco, Calif., June 26-29, the entire contents of which are hereby incorporated herein.

In addition to equations described above, the global volume balance condition may be satisfied:

$$\int_0^t Q(t)dt = \int_0^{L(t)} H(s,t)\overline{w}(s,t)ds + \int_{H_L} \int_0^t \int_0^{L(t)} 2g_L \, dsdtdh_l \quad (16)$$

where $g_L$ is fluid leakoff velocity, Q(t) is time dependent injection rate, H(s,t) is the height of the fracture at spatial point s(x,y) and at the time t, ds is length increment for integration along fracture length, $d_t$ is time increment, $dh_l$ is increment of leakoff height, $H_L$ is leakoff height, and so is a spurt loss coefficient. Equation (16) provides that the total volume of fluid pumped during time t is equal to the volume of fluid in the fracture network and the volume leaked from the fracture up to time t. Here L(t) represents the total length of the hydraulic fracture network (HFN) at the time t and $S_0$ is the spurt loss coefficient. The boundary conditions may use the flow rate, net pressure and fracture width to be zero at all fracture tips.

The system of Eq. 12-16, together with initial and boundary conditions, may be used to represent a set of governing equations. Combining these equations and discretizing the fracture network into small elements may lead to a nonlinear system of equations in terms of fluid pressure p in each element, simplified as f(p)=0, which may be solved by using a damped Newton-Raphson method.

The generating 872 may involve modeling the smooth fracture behavior to solve the governing equations and determine the smooth fracture parameters. Unconventional (or complex) Fracture Models (UFMs) have been developed to understand subsurface fracture networks. These models may be used, for example, to simulate complex fracture network propagation in a formation with pre-existing natural fractures. The following patents/applications disclose aspects of this modeling, among other things, and each of the following are incorporated by reference herein in their entireties: U.S. Pat. No. 8,412,500; 2014/0305638, Ser. Nos. 14/350,533; 14/664,362; 7,784,544; 12/462,244; 13/517,007; 14/004,612; 14/126,201; 14/356,369; 13/968,648; 14/423,235; and PCT Application Nos. PCT/US2014/064205; PCT/US2013/076765; and PCT/US2014/045182.

The modeling may be performed using existing modeling software, such as UFM™ commercially available from SCHLUMBERGER TECHNOLOGY CORPORATION™ at www.slb.com. Conventional planar fracture models, such as UFM, may model various aspects of the fracture network, such as application of the governing equations to the smooth fracture. Constrained models may be provided to give a fundamental understanding of involved mechanisms, but may be complex in mathematical description and/or require computer processing resources and time in order to provide accurate simulations of hydraulic fracture propagation. The models may consider various factors and/or data and may be used for fracturing treatment design during well planning and job execution and in post job evaluation.

II. Ledged Fracture Operations

In order to address complex fracture issues, such as ledges, additional constraints may need to be considered. The UFM may be provided with the additional capability to simulate the interaction of hydraulic fractures with interfaces that form ledges. This constrained model may be configured to perform simulations that consider complex factors, such as interaction between fractures and interfaces over time and under desired conditions as is described further herein.

To address such issues, the method 800 also involves 874 generating ledged fracture parameters for ledged fractures of the fracture network, such as those depicted in FIGS. 5.2 and 7.1-7.3. In order to consider the effect of ledges on fracture operations, fracture parameters, such as the geometry of the fracture and placement of the proppant which may affect how fluid may be produced through such fractures, may be determined. The generating 874 may involve a) identifying ledge locations, and b) generating the ledged fracture parameters for the ledged fractures at the fracture location.

The a) identifying ledge locations may involve detecting potential interfaces where fracture ledges may occur to determine locations where ledges are likely to occur. Potential interfaces (e.g., weak formation interfaces) where fracture discontinuities (e.g., ledges and/or offsets) may occur may be identified, for example, by empirical and/or analytical means. The disclosure does not require specific techniques that can be used to identify weak formation interfaces.

Empirically, weak formation interfaces may be detected via techniques including, but not limited to, core analysis (e.g., observations and testing), log (e.g., petrophysical and/or mechanical) interpretation, field observations (e.g., outcrops), seismic or microseismic interpretation, and/or other monitoring. Various sensors or measuring devices, such as logging tools may be deployed into the wellbore to log formation measurements and/or generate wireline logs used to identify thin intervals of different properties. For example, an ash bed can be identified as a high clay content interval via measurements made with geomchemical tools, or neutron-density tools. Dielectric measurements can also identify these zones by detecting the high concentration of clay bound water. These layers will appear as conductive beds on resistivity image logs.

Ultrasonic acoustic measurements may also be used to identify boundaries of materials with differences in material properties. Examples of ultrasonic measurements are provided in International Patent Application Number PCT/US16/40933. High resolution caliper logs can identify intervals whose diameter has increased or decreased beyond the size of the drill bits. The point where these intervals meet competent intervals which retain the bit diameter can be assumed to be weak interfaces.

Similarly, boundaries of layers with significantly different properties can be identified from core samples. Wireline coring tools may be deployed to capture core samples. Scratch tests may be performed on the core samples and measurements taken to identify relative strength of a given layer. Contrasts in strengths between bounding intervals may indicate an interface which has the potential to fail during stimulation. Core samples may also be measured to identify sub-horizontal partially open features such as styolites. Thin section analyses on core may be used to identify features such as bedded kerogen which may increase the odds of bed parting during stimulation under the appropriate geomechanical conditions. Other measurements, such as exposing the core to UV light and locating weak ash beds prone to illumination under UV light, may also be used.

Potential ledges can also be inferred from field measurements and/or observations. These observations may include core analysis, logs, etc. Core analysis may be used to identify weak interfaces via various observations and techniques such as but not limited to, parted beds not associated with the coring and retrieval pressures, high resolution measurements that identify weak interface mechanical properties such as Young's modulus, tensile strength, unconfined compressive strength, formation density, mineralogy among others. High resolution log measurements such as but not limited to resistivity, conductivity, density, acoustic, dielectric.

Other observations that may indicate a ledge may include instances where fracture vertical height is limited and unaccounted for by other known factors to cause height containment, such as stress contrast between layers, microseismic and/or tiltmeter monitoring of the stimulation treatment, that indicates vertical fracture containment that is not predicted from minimum horizontal stress profiles, and indications of proppant not passing certain layer interface. Failure of proppant to pass through layers may be inferred from radioactive and non-radioactive tracer measurements, post stimulation dipole sonic measurements, lack of production interference between layers and/or no depletion in the layers not penetrated by the proppant, and/or based on the data obtained from, for example, production history, production logging or pressure response when drilling or testing offset wells.

Analytically, the a) identifying ledge locations may involve estimating or predicting fracture propagation and ledge locations (e.g., through identifying the rock types and their petrophysical or mechanical characteristics). Mathematical models may be used to predict potential interfaces, such as hydraulic fracture tip propagation behavior as it crosses an interface. For example, the mathematical modeling of fracture propagation through formation interface may be used to determine the likelihood of fracture offset as it crosses the interface. Ledge fracture operations described herein may be performed alone or in conjunction with smooth fracture operations and/or other fracture operations, such as stress shadowing as described in US Patent No. Application No. 2014/0305638, previously incorporated by reference herein.

Figure 9:
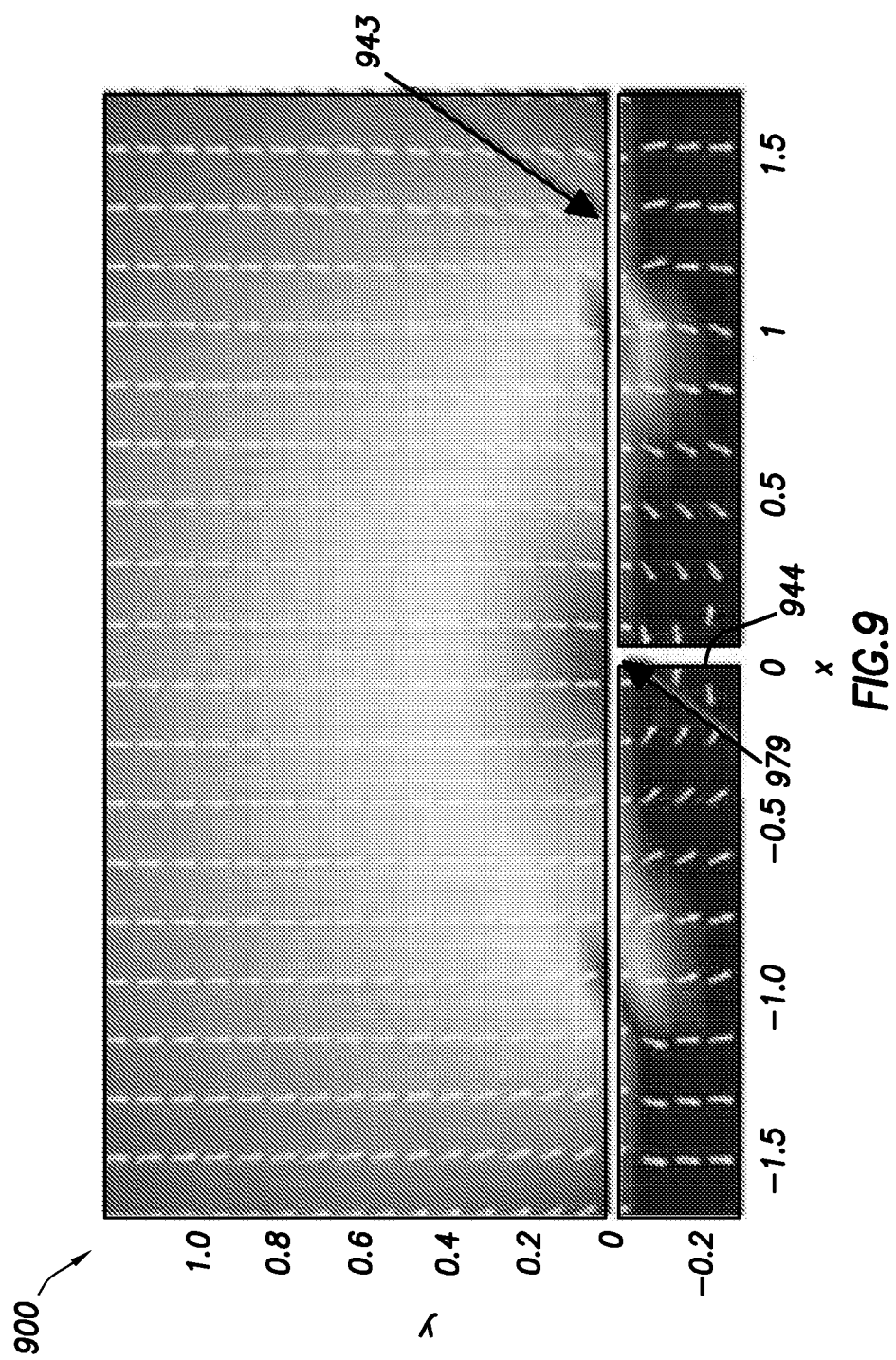
FIG. 9 is a graph depicting predicted stresses about a fracture at an intersection in the subterranean formation.

A formation interface that has a likelihood of causing an approaching hydraulic fracture tip to deflect at the interface can also be assessed using mathematical models. FIG. 9 is a plot 900 depicting an example of a model used in interface detection. The graph 900 is a 2D plot (x vs. y-axis) of a hydraulic fracture 944 along a layer interface 943 in a formation. This figure shows a model predicted tensile stress field near a hydraulic fracture bedding plane intersection of an upward propagating fracture 944 that is temporarily arrested by the interface 943. The fracture 944 has a tip 979 that intersects with the interface 943. The graph 900 has darker regions that show lower stress, and the lighter regions show higher stress.

As shown by FIG. 9, the model predicts the shear slippage that occurs near the intersection 943, and the stress concentration near the tip 979 of the shear slip zones. This kind of model can be used to determine the likely occurrence of the secondary fracture initiation in the rock above the interface, which leads to a deflection of the vertical fracture path and formation of a ledge. Examples of models that may be used are provided in Chuprakov, D. and Prioul, R., "Hydraulic Fracture Height Containment by Weak Horizontal Interfaces", SPE 173337 presented at HFTC, Woodlands, Tex., 3-5 Feb. 2015, the entire contents of which is hereby incorporated by reference herein.

The estimated ledge parameters may be calibrated by comparison with the ledge parameters determined empirically. For example, the modeled ledge parameters may be confirmed by comparison with the observations in the field operation, including, but not limited to, microseismic events, production logging or other diagnostic logging, well production performance, and pressure communication between different treatment stages in a well or different wells.

The b) generating ledged fracture parameters may involve using the identified ledge locations (potential interfaces) in generating fracture parameters (e.g., fracture geometry and proppant distribution). The generating may be performed by using the ledge locations to define ledged boundary conditions and solving the governing equations (e.g., Eqns. (1-16)) using the ledged boundary conditions. The ledge fracture parameters may also be determined based at least in part on the generated smooth fracture parameters.

The boundaries may be determined by the boundary conditions implemented in the model, and the result of the simulation using the model. This may involve describing position of ledges in the fracture based on measured data. The identified potential ledges may be used in a fracture simulator for prediction of the effect of ledges on fracture geometry and proppant distribution. If the existence and the locations of ledges can be determined through identifying the rock types and their petrophysical or mechanical characteristics, they can be modeled in the fracture simulator to provide more accurate prediction of proppant distribution, which may allow engineers to make proper design considerations to optimize the completion and treatment parameters to achieve maximum production.

As shown in FIGS. 7.2 and 7.3, the effect of the ledges may be included using a two dimensional grid to represent the horizontally splitting of the fracture along the ledges. Proppant transport resulting from the blocked flow of proppant through this barrier, while letting the fracturing fluid flow through. This may be used to modify the proppant placement.

For more complex fractures, a combination of various interactions may be present. To properly account for these interactions and remain computationally efficient so that it can be incorporated in the complex fracture network model, a proper modeling framework may be constructed. To simulate the propagation of a complex fracture network that includes many intersecting fractures, equations governing the underlying physics of the fracturing process may be used.

The governing equations may be solved for the ledged fracture parameters by applying the wellsite parameters for the ledges at the ledge locations and according to the defined boundary conditions. The identified ledges may be included as input in a fracture design simulation. The simulation can be conducted using a fracture model that properly accounts for flow distribution within the fracture into different segments of the fracture separated by the ledges. For example, the model may use Stacked Height features to model the fracture geometry to provide gridding (FIGS. 7.2 and 7.3 to provide vertical rows in the velocity fields) and use the boundary conditions of the ledges in the governing equations. An example Stacked Height model that may be used is described in patent application Ser. No. 14/664,362 filed 20 Mar. 2015 by Weng et al., the entire contents of which is hereby incorporated by reference herein.

The model may also use features that consider conditions for proppant bridging or passing the ledges during pumping and shut-in periods. This model may use the UFM™ Stacked Height Growth model in which a model of ledges has been integrated. The current version of the ledges model requires the user to input which of the reservoir zones has a ledge at its bottom interface. In addition, the model lets the user define a connector region around the perforation inside which the ledges do not influence proppant transport and where there is no settling. This feature lets the user provide a good connection between the propped areas and the perforation. Another approach involves defining the connector region as the fracture area where the fracture width is large enough (meaning above a predefined critical width) for the ledges not to influence the proppant transport and placement.

The model for ledges interacts with the Stacked Height Growth model in the sense that the ledges model tells it that a vertical splitting into a stack of elements is required where the fracture height covers a ledge. Then the model of ledges tells the proppant transport model in the Stacked Height Growth model that the proppant cannot be transferred across the ledges except inside the connector region. This applies to transport by convection and by settling. The expected result is that at the end of shut-in, the proppant settling will potentially form proppant banks at the depth of the ledges.

EXAMPLE

FIGS. 10.1 and 10.2 depicts an example case involving a simple bi-wing fracture 944 generated using a Stacked Height Growth model. The fracture 944 has a complex stress profile and provided with a fracturing fluid of 100 cp and a proppant size of 20/40 mesh sand. FIGS. 10.1 and 10.2 depict simulation grids 1000.1, 1000.2 for a Stacked Height Growth Model for the fracture 944.1 with and the fracture 944.2 without ledges, respectively. The grids 1000.1, 1000.2 plot total vertical depth (TVD) (in/cm) (y-axis) versus area ($in^2/cm^2$) (x1 axis), and stress profiles 1080.1, 1080.2 with the same y-axis and Stress (kPa) along an x2 axis. To the left of the grids 1000.1, 1000.2 are placed the corresponding normal stress profiles 1080.1, 1080.2 and the perforation 1041 location.

FIGS. 10.1 and 10.2 compare the gridding of the fracture at the end of shut-in for the case without ledges and with ledges, respectively (see also, FIGS. 6.1-7.3). Both grids show splitting 1082.1 from the Stacked Height Growth model. As shown by FIG. 10.2, the ledges create additional vertical splitting 1082.2 beyond those shown by FIG. 10.1. As also shown by FIG. 10.2, the input indicates three ledges 1060 and connector region 1083 with a radius of 20 meters. In FIG. 10.2, the Stacked Height Growth model has produced stacks of elements 1082.1 where the fracture has propagated into lower stress layers. This comparison also shows that the fracture 944.1, 944.2 generated is different with and without ledges 1060. The additional vertical splitting depths 1082.2 due to the ledges 1060 may be used to further define the fracture propagation and proppant transport.

Without wishing to be bound by any theory, two reasons for these results could be that: 1) the ledges modify proppant placement, and proppant modifies the rheological properties of the slurry (apparent viscosity), and the fracture propagation and growth depends on the properties of the fluid, or 2) the ledges trigger additional splitting, which means that the calculation of the pressure profile inside the fracture cross section is modified, accounting now for the vertical flow restriction at the depth of the ledges. Regardless of the cause, these differences may impact the fracture and/or production performance.

The additional vertical splitting depths detected in FIG. 10.2 may be used in the modeling of the fracture over time as shown by FIGS. 11.1-11.4. These figures depict a simulation grid 1100 over time for a Stacked Height Growth Model for a single fracture with ledges. The grid 1100 plots total vertical depth (TVD) (in/cm) (y-axis) versus area ($in^2/cm^2$) (x1 axis), and stress profiles 1080.1 with the same y-axis and Stress (kPa) along an x2 axis.

FIGS. 11.1-11.4 show proppant distribution for ledged fractures generated using the Stacked Height Growth model at four different times: stage 0) when proppant injection begins, stage I) at the end of pumping, stage II) during shut-in, and stage III) at the end of shut-in (see, e.g., FIGS. 6.1 and 7.1). As shown in FIG. 11.4, proppant accumulates in banks on the ledges 1060 due to proppant settling at the ledges 1060, and the proppant 443.2 remains suspended in the connector region 1083.

To simulate the propagation of multiple or complex fractures, the fracture model may also take into account an interaction among fractures or between fractures and interfaces (see, e.g., FIG. 3.1). Various complex fracture network models (e.g., UFM) may be used (see, e.g., Weng, X, Kresse, O., Wu, R., and Gu, H., *Modeling of Hydraulic Fracture Propagation in a Naturally Fractured Formation. Paper SPE* 140253 presented at the SPE Hydraulic Fracturing Conference and Exhibition, Woodlands, Tex., USA, Jan. 24-26 (2011) (hereafter "Weng 2011"); Kresse, O., Cohen, C., Weng, X, Wu, R., and Gu, H. 2011 (hereafter "Kresse 2011"). *Numerical Modeling of Hydraulic Fracturing in Naturally Fractured Formations.* 45*th US Rock Mechanics/ Geomechanics Symposium*, San Francisco, Calif., June 26-29, the entire contents of which are hereby incorporated herein).

The method 800 may also involve validating 876 the fracture parameters by comparing the 874 generated ledged fracture parameters with the measured fracture parameters. Examples of calibrating techniques (which may be used for the validating) are provided in US Patent Application No. 2014/0372089, the entire contents of which are hereby incorporated by reference herein.

Validating may involve, for example, comparing measurements, such as microseismic monitoring of indirect measurement of fracture length and height, fiber optic based distributed temperature sensing and distributed acoustic sensing for near well measurement of flow distribution in the perforated intervals, radioactive tracer logging for near well measurement of the proppant placement, and temperature and acoustic logging for near well measurement of the fracture height, with the generated fracture parameters. The ledge parameters validated based on, for example, the measured fracture geometry and production history may be used in the subsequent fracture treatments in neighboring wells to achieve improved fracture design and production performance.

If the comparing is outside a maximum range (Δ>Max), adjusting 878 the collected wellsite parameters used in the generating 872 may be performed, and the generating 874 repeated. The ledge parameters (e.g., locations and geometry), as well as wellsite (e.g., formation and wellbore) parameters can also be adjusted until the determined fracture geometry matches the measured fracture geometry. For example, the fracture geometry may be adjusted based on the predicted proppant distribution.

The production history of the stimulated well may be simulated using a reservoir simulator (e.g., INTERSECT™ or ECLIPSE™ commercially available from SCHLUMBERGER TECHNOLOGY CORPORATION™ at www.slb.com) and the determined fracture geometry and proppant distribution. This simulated production history can be compared to the actual well production history. History match can be performed by adjusting the formation parameters within acceptable range of uncertainty as in the conventional production engineering practices. This history match may not be satisfactory and require further adjustment of the ledge positions and properties, and the method repeated to obtain better production history match. Part or all of the methods may be performed in any order and repeated as desired.

The fracture geometry and proppant placement may be evaluated against treatment design objectives, such as vertical proppant coverage and its continuity in the target formation intervals, and lateral propped fracture length. Operational adjustments such as, adjustment of pumping schedule (pump rate, selection fluid, selection of proppant, fluid volume, proppant volume) and adjustment of perforation locations and/or planned well trajectory so the perforations are moved above or below the ledges, may be made based on the evaluation of the simulation results. The generating 872 and 874 may be repeated after each adjustment until satisfactory treatment design is obtained.

If the comparing is within a maximum range, the method continues to 879 performing production operations based on the validated fracture geometry. After the validation 876, the model can be used to optimize the treatment design to achieve the desired stimulation objectives to maximize well production. This may include changing the placement of horizontal wells, placement of perforations to minimize the adverse impact of ledges on well productivity, or altering the stimulation pumping schedule via fluid viscosity and volume, proppant type, size and concentration, and injection rate.

In another example, for horizontal wells, the landing point of the lateral may be selected such that exposure to these features is minimized. A lateral could be placed above the ledges so that they can act as a downward to downward fracture growth. The ledges may be used as a bridging point for proppant so that higher concentrations can be placed in reservoir sections above the ledges. Boundaries, concentrations of solids at each boundary, and/or other operational parameters may also be defined.

With the location of potential interfaces identified, operational decisions can be made accounting for such interfaces. The fracturing treatment parameters may be optimized to achieve the desired stimulation objectives to maximize well production. For example, in vertical wells, such interfaces may be avoided by perforating away from these features since they may restrict height growth and thus exposures to productive intervals in the reservoir. If unavoidable, then higher injection rates and/or viscous fluids may be used in an attempt to propagate vertical fractures across these ledges and interfaces. Production of fluids may be optimized by defining the fracture parameters based on the ledged fracture parameters and fracturing the subterranean formation according to the defined fracture parameters.

Part or all of the methods provided herein may be performed in any order and repeated as desired.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

It should be noted that in the development of any such actual embodiment, or numerous implementation, specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the embodiments used/disclosed herein can also include some components other than those cited.

In the description, each numerical value should be read once as modified by the term "about" (unless already expressly so modified), and then read again as not so modified unless otherwise indicated in context. Also, in the description, it should be understood that any range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific ones, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention. All references cited herein are incorporated by reference into the current application in their entirety.

Although only a few example embodiments have been described in detail above, those skilled in the art will readily appreciate that many modifications are possible in the example embodiments without materially departing from the system and method for performing complex fracture operations at a wellsite having ledged fractures. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of performing a fracture operation at a wellsite, the wellsite positioned about a subterranean formation having a wellbore therethrough and a fracture network therein, the fracture network comprising natural fractures, the method comprising:
   generating wellsite parameters of the wellsite comprising seismic measurements;
   generating smooth fracture parameters of a smooth fracture by solving governing equations for the smooth fracture based on the wellsite parameters;
   generating ledged fracture parameters of a ledged fracture by identifying ledge locations and solving the governing equations for the ledged fracture based on the wellsite parameters for the ledge locations; and
   designing the fracture operation for the wellsite based on the ledged fracture parameters,
   wherein the solving the governing equations for the smooth fracture comprises:
      determining fracture deformation for the smooth fracture;
      determining fluid flow for the smooth fracture;
      determining boundary conditions and fracture propagation for the smooth fracture; and
      determining proppant transport for the smooth fracture.

2. The method of claim 1, wherein the smooth and ledged fracture parameters comprise fracture geometry and proppant distribution.

3. The method of claim 1, further comprising validating the ledged fracture parameters by comparing the generated ledge fracture parameters with the measured wellsite parameters.

4. The method of claim 3, further comprising adjusting the wellsite parameters where a difference between the generated ledge fracture parameters and the measured fracture parameters are greater than a predefined maximum and repeating the generating smooth fracture parameters and the generating ledged fracture parameters.

5. The method of claim 3, further comprising performing fracture operations based on the validated fracture geometry.

6. The method of claim 1, wherein the fracture operation comprises at least one of injecting, pumping, and perforating.

7. A method of performing a fracture operation at a wellsite, the wellsite positioned about a subterranean formation having a wellbore therethrough and a fracture network therein, the fracture network comprising natural fractures, the method comprising:
   generating wellsite parameters of the wellsite comprising seismic measurements;
   generating smooth fracture parameters of a smooth fracture by solving governing equations for the smooth fracture based on the wellsite parameters;
   generating ledged fracture parameters of a ledged fracture by identifying ledge locations and solving the governing equations for the ledged fracture based on the wellsite parameters for the ledge locations; and
   designing the fracture operation for the wellsite based on the ledged fracture parameters,
   wherein the solving the governing equations for the ledged fracture comprises:
      determining the fracture deformation for the ledged fracture;
      determining the fluid flow for the ledged fracture;
      determining the boundary conditions and the fracture propagation for the ledged fracture; and
      determining the proppant transport for the ledged fracture.

8. The method of claim 7, wherein the identifying ledge locations comprises:
   detecting formation interfaces by monitoring the formation;
   estimating the formation interfaces; and
   calibrating the formation interfaces by comparing the estimated formation interfaces with the detected formation interfaces.

9. The method of claim 8, wherein the estimating comprises modeling the formation interfaces using a stacked height model.

10. The method of claim 8, wherein the monitoring comprises at least one of logging, measuring, and observing the subterranean formation.

11. The method of claim 7, wherein the smooth and ledged fracture parameters comprise fracture geometry and proppant distribution.

12. The method of claim 7, wherein the fracture operation comprises at least one of injecting, pumping, and perforating.

13. The method of claim 7, further comprising validating the ledged fracture parameters by comparing the generated ledge fracture parameters with the measured wellsite parameters.

14. The method of claim 13, further comprising adjusting the wellsite parameters where a difference between the generated ledge fracture parameters and the measured fracture parameters are greater than a predefined maximum and repeating the generating smooth fracture parameters and the generating ledged fracture parameters.

15. The method of claim 13, further comprising performing fracture operations based on the validated fracture geometry.

16. A method of performing a fracture operation at a wellsite, the wellsite positioned about a subterranean formation having a wellbore therethrough and a fracture network therein, the fracture network comprising natural fractures, the method comprising:
    logging seismic measurements of the subterranean formation;
    generating smooth fracture parameters of a smooth fracture by solving governing equations for the smooth fracture based on the wellsite parameters;
    generating ledged fracture parameters of a ledged fracture by identifying ledge locations and solving the governing equations for the ledged fracture based on the wellsite parameters; and
    optimizing production of fluids from the subterranean formation by designing the fracture parameters based on the ledged fracture parameters and fracturing the subterranean formation according to the designed fracture parameters,
    wherein the generating ledged fracture parameters comprises determining boundary conditions for the governing equations based on the ledge locations of the ledged fractures.

17. A method of performing a fracture operation at a wellsite, the wellsite positioned about a subterranean formation having a wellbore therethrough and a fracture network therein, the fracture network comprising natural fractures, the method comprising:
    measuring fracture parameters of the subterranean formation;
    generating smooth fracture parameters of a smooth fracture by solving governing equations for the smooth fracture based on the wellsite parameters;
    generating ledged fracture parameters of a ledged fracture by identifying ledge locations and solving the governing equations for the ledged fracture based on the wellsite parameters; and
    fracturing the subterranean formation based on the ledged fracture parameters; and
    pumping fluid from the fractured subterranean formation, wherein the solving the governing equations for the ledged fracture comprises:
    determining the fracture deformation for the ledged fracture;
    determining the fluid flow for the ledged fracture;
    determining the boundary conditions and the fracture propagation for the ledged fracture; and
    determining the proppant transport for the ledged fracture.

18. The method of claim 17, further comprising mapping microseismic events based on the measuring.

19. The method of claim 17, wherein the fracturing comprises injecting fluid with proppant into the subterranean formation.

* * * * *